US012014321B2

(12) United States Patent
Rongley

(10) Patent No.: US 12,014,321 B2
(45) Date of Patent: Jun. 18, 2024

(54) SYSTEMS, METHODS, COMPUTING PLATFORMS, AND STORAGE MEDIA FOR DIRECTING AND CONTROLLING AN AUTONOMOUS INVENTORY MANAGEMENT SYSTEM IN A RETAIL CONTROL TERRITORY

(71) Applicant: Autonomous Shelf, Inc., Denver, CO (US)

(72) Inventor: Eric Rongley, Golden, CO (US)

(73) Assignee: Prime Robotics, Inc., Denver, CO (US)

( * ) Notice: Subject to any disclaimer, the term of this patent is extended or adjusted under 35 U.S.C. 154(b) by 0 days.

(21) Appl. No.: 17/335,541

(22) Filed: Jun. 1, 2021

(65) Prior Publication Data

US 2022/0012677 A1 Jan. 13, 2022

Related U.S. Application Data

(60) Provisional application No. 63/033,686, filed on Jun. 2, 2020.

(51) Int. Cl.
*G06Q 10/087* (2023.01)
*G06K 7/10* (2006.01)
*G06Q 30/0251* (2023.01)

(52) U.S. Cl.
CPC ....... *G06Q 10/087* (2013.01); *G06K 7/10297* (2013.01); *G06Q 30/0255* (2013.01)

(58) Field of Classification Search
CPC ............. G06Q 10/087; G06Q 30/0255; G06K 7/10297
See application file for complete search history.

(56) References Cited

U.S. PATENT DOCUMENTS

| | | | |
|---|---|---|---|
| 6,748,292 B2 | 6/2004 | Mountz | |
| 6,819,218 B2 | 11/2004 | Mabuchi et al. | |

(Continued)

FOREIGN PATENT DOCUMENTS

| | | | |
|---|---|---|---|
| CA | 2936393 A1 | 1/2017 | |
| CN | 2726446 Y * | 9/2005 | |

(Continued)

OTHER PUBLICATIONS

"Automated Load Measuring System", Cast Engineering, ALMS, 2016, 4 pages, Online available at <https://fuelmonitoring.org>, 2016.

(Continued)

*Primary Examiner* — A. Hunter Wilder
(74) *Attorney, Agent, or Firm* — Neugeboren O'Dowd PC

(57) ABSTRACT

Systems, methods, computing platforms, and storage media for dynamically organizing autonomous storage units in a retail control territory are disclosed. Exemplary implementations may identify a plurality of autonomous storage units, wherein each autonomous storage unit is configured to hold one or more inventory items; identify an inventory level for each of the plurality of autonomous storage units; determine a first arrangement for the plurality of autonomous storage units based in part on one or more first factors; organize the plurality of storage units in the first arrangement; identify one or more second factors; determine a second arrangement for at least a portion of the plurality of autonomous storage units based on the one or more second factors; and direct the at least the portion of the plurality of autonomous storage units to organize in the second arrangement.

20 Claims, 11 Drawing Sheets

(56) References Cited

U.S. PATENT DOCUMENTS

| | | | |
|---|---|---|---|
| 6,950,722 | B2 | 9/2005 | Mountz |
| 7,243,001 | B2 | 7/2007 | Janert et al. |
| 7,402,018 | B2 | 7/2008 | Mountz et al. |
| 7,850,413 | B2 | 12/2010 | Fontana |
| 7,881,820 | B2 | 2/2011 | Antony et al. |
| 7,894,933 | B2 | 2/2011 | Mountz et al. |
| 7,912,574 | B2 | 3/2011 | Wurman et al. |
| 7,920,962 | B2 | 4/2011 | D'Andrea et al. |
| 8,086,344 | B1 | 12/2011 | Mishra et al. |
| 8,103,377 | B1 | 1/2012 | Wong et al. |
| 8,220,710 | B2 | 7/2012 | Hoffman et al. |
| 8,234,006 | B1 | 7/2012 | Sachar et al. |
| 8,239,291 | B2 | 8/2012 | Hoffman et al. |
| 8,265,873 | B2 | 9/2012 | D'Andrea et al. |
| 8,280,547 | B2 | 10/2012 | D'Andrea et al. |
| 8,306,650 | B1 | 11/2012 | Antony et al. |
| 8,326,452 | B2 | 12/2012 | Somin et al. |
| 8,433,437 | B1 | 4/2013 | Shakes et al. |
| 8,527,325 | B1 | 9/2013 | Atreya et al. |
| 8,594,834 | B1 | 11/2013 | Clark et al. |
| 8,606,392 | B2 | 12/2013 | Wurman et al. |
| 8,626,335 | B2 | 1/2014 | Wurman et al. |
| 8,639,382 | B1 | 1/2014 | Clark et al. |
| 8,718,814 | B1 | 5/2014 | Clark et al. |
| 8,798,784 | B1 | 8/2014 | Clark et al. |
| 8,798,786 | B2 | 8/2014 | Wurman et al. |
| 8,805,573 | B2 | 8/2014 | Brunner et al. |
| 8,805,574 | B2 | 8/2014 | Stevens et al. |
| 8,825,197 | B1 | 9/2014 | Guan |
| 8,831,984 | B2 | 9/2014 | Hoffman et al. |
| 8,892,240 | B1 | 11/2014 | Vliet et al. |
| 8,909,368 | B2 | 12/2014 | D'Andrea et al. |
| 8,930,133 | B2 | 1/2015 | Wurman et al. |
| 8,958,903 | B1 | 2/2015 | Rotella et al. |
| 8,965,562 | B1 | 2/2015 | Wurman et al. |
| 8,972,045 | B1 | 3/2015 | Mountz et al. |
| 9,008,827 | B1 | 4/2015 | Dwarakanath et al. |
| 9,008,829 | B2 | 4/2015 | Worsley |
| 9,365,348 | B1 | 6/2016 | Agarwal et al. |
| 9,656,805 | B1 | 5/2017 | Evans et al. |
| 9,764,836 | B1 | 9/2017 | Elzinga et al. |
| 9,916,562 | B1 | 3/2018 | Armato |
| 10,121,119 | B2 | 11/2018 | Haverinen |
| 10,222,798 | B1 | 3/2019 | Brady et al. |
| 10,303,171 | B1 | 5/2019 | Brady et al. |
| 11,308,444 | B2 | 4/2022 | Rongley |
| 11,520,337 | B2 | 12/2022 | Rongley |
| 2004/0093116 | A1* | 5/2004 | Mountz ............... G05D 1/0274 700/216 |
| 2007/0080000 | A1 | 4/2007 | Tobey et al. |
| 2008/0040182 | A1 | 2/2008 | Wegner et al. |
| 2008/0167884 | A1 | 7/2008 | Mountz et al. |
| 2011/0103924 | A1 | 5/2011 | Watt et al. |
| 2011/0153063 | A1 | 6/2011 | Wurman et al. |
| 2011/0320322 | A1* | 12/2011 | Roslak ............... G06Q 10/087 705/28 |
| 2012/0066626 | A1* | 3/2012 | Geleijnse ............ G06Q 30/02 715/765 |
| 2013/0054005 | A1 | 2/2013 | Stevens et al. |
| 2013/0103552 | A1 | 4/2013 | Hoffman et al. |
| 2013/0173049 | A1 | 7/2013 | Brunner et al. |
| 2014/0046585 | A1 | 2/2014 | Morris et al. |
| 2014/0195040 | A1 | 7/2014 | Wurman et al. |
| 2014/0297470 | A1 | 10/2014 | Ramadge et al. |
| 2014/0350831 | A1 | 11/2014 | Hoffman et al. |
| 2015/0073589 | A1 | 3/2015 | Khodl et al. |
| 2015/0151912 | A1 | 6/2015 | Mountz et al. |
| 2015/0151913 | A1 | 6/2015 | Wong et al. |
| 2015/0202770 | A1 | 7/2015 | Patron et al. |
| 2015/0324735 | A1 | 11/2015 | Lord et al. |
| 2015/0336270 | A1 | 11/2015 | Storr |
| 2015/0353280 | A1 | 12/2015 | Brazeau et al. |
| 2015/0353282 | A1 | 12/2015 | Mansfield et al. |
| 2016/0019497 | A1 | 1/2016 | Carvajal |
| 2016/0236867 | A1 | 8/2016 | Brazeau et al. |
| 2016/0257401 | A1 | 9/2016 | Buchmueller et al. |
| 2016/0292634 | A1 | 10/2016 | Mehring et al. |
| 2017/0061371 | A1 | 3/2017 | Haverinen |
| 2017/0088360 | A1 | 3/2017 | Brazeau et al. |
| 2017/0136931 | A1 | 5/2017 | Colantonio et al. |
| 2017/0161486 | A1 | 6/2017 | Jeon et al. |
| 2017/0217683 | A1 | 8/2017 | Lyon et al. |
| 2017/0293294 | A1 | 10/2017 | Atchley et al. |
| 2018/0024554 | A1 | 1/2018 | Brady et al. |
| 2018/0032949 | A1 | 2/2018 | Galluzzo et al. |
| 2018/0058739 | A1 | 3/2018 | Zou |
| 2018/0074504 | A1 | 3/2018 | Shydo, Jr. |
| 2018/0086353 | A1 | 3/2018 | Holbrooke et al. |
| 2018/0086561 | A1 | 3/2018 | Stubbs et al. |
| 2018/0189724 | A1* | 7/2018 | Mattingly ............ B65G 1/02 |
| 2018/0357848 | A1 | 12/2018 | McLellan et al. |
| 2019/0072979 | A1 | 3/2019 | Sukhomlinov et al. |
| 2020/0065748 | A1 | 2/2020 | Durkee et al. |
| 2020/0078936 | A1 | 3/2020 | Wu et al. |
| 2020/0122927 | A1 | 4/2020 | Bellar et al. |
| 2020/0219348 | A1 | 7/2020 | Hanlon |
| 2020/0225665 | A1 | 7/2020 | Rongley |
| 2020/0364652 | A1 | 11/2020 | Rongley |
| 2020/0364653 | A1 | 11/2020 | Rongley |
| 2021/0073716 | A1 | 3/2021 | Dearing |
| 2021/0276805 | A1 | 9/2021 | Rongley |
| 2021/0395012 | A1 | 12/2021 | Liu et al. |
| 2022/0009715 | A1 | 1/2022 | Rongley |
| 2022/0351118 | A1 | 11/2022 | Rongley |
| 2023/0244236 | A1 | 8/2023 | Rongley |
| 2024/0077870 | A1 | 3/2024 | Park |

FOREIGN PATENT DOCUMENTS

| | | | | |
|---|---|---|---|---|
| CN | 203020893 | U | | 6/2013 |
| CN | 105314315 | B | | 12/2017 |
| CN | 206975763 | U | * | 2/2018 |
| EP | 2136329 | A2 | * | 12/2009 ............ G06Q 30/02 |
| EP | 1590272 | B1 | | 8/2010 |
| KR | 20190070700 | A | | 6/2019 |
| WO | 2007149194 | A2 | | 12/2007 |
| WO | 2007149703 | A2 | | 12/2007 |
| WO | 2020123445 | A1 | | 6/2020 |
| WO | 2020227379 | A1 | | 11/2020 |
| WO | 2020227381 | A1 | | 11/2020 |

OTHER PUBLICATIONS

Final Office Action received for U.S. Appl. No. 16/708,618 dated Apr. 25, 2022, 82 pages.

International Preliminary Report on Patentability received for International PCT Application Serial No. PCT/US2019/065377 dated Jun. 24, 2021, 15 pages.

International Preliminary Report on Patentability received for International PCT Application Serial No. PCT/US2020/031631 dated Nov. 18, 2021, 9 pages.

International Preliminary Report on Patentability received for International PCT Application Serial No. PCT/US2020/031634 dated Nov. 18, 2021, 8 pages.

Notice of Allowance received for U.S. Appl. No. 16/867,711 dated Dec. 14, 2021, 42 pages.

Raj et al., "Analyzing Critical Success Factors for Implementation of Drones in the Logistics Sector using Grey-DEMATEL Based Approach", Computers and Industrial Engineering, vol. 138, No. 106118, 12 pages, 2019.

Response filed on Jan. 6, 2022 for Non Final Office Action of U.S. Appl. No. 16/708,618 dated Jul. 7, 2021, 25 pages.

Response filed on Oct. 1, 2021 for Non Final Office Action of U.S. Appl. No. 16/867,711 dated Apr. 1, 2021, 25 pages.

Cooley, Chase Littlejohn, "Office Action Regarding U.S. Appl. No. 16/708,618", dated Jul. 7, 2021, p. 56, Published in: US.

Young, Lee, "International Search Report and Written Opinion Regarding International Application No. PCT/US2019/65377", dated Mar. 30, 2020, p. 23, Published in: US.

Thomas, Shane, "International Search Report and Written Opion Regarding International Application No. PCT/US20/31634", dated Aug. 7, 2020, p. 9, Published in: US.

(56) References Cited

OTHER PUBLICATIONS

Bruner, Nicole Elena, "Office Action Regarding U.S. Appl. No. 16/867,711", dated Apr. 1, 2021, p. 49, Published in: US.

Lee Young, "International Search Report and Written Opinion Regarding International Application No. PCT/US20/31631", dated Aug. 4, 2020, p. 16, Published in: US.

Thomas, Shane, "International Search Report and Written Opinion Regarding International Application No. PCT/US21/21482", dated Jul. 19, 2021, p. 25, Published in: US.

International Preliminary Report on Patentability received for International PCT Application Serial No. PCT/US2021/021482 dated Sep. 6, 2022, 10 pages.

Shead, Sam, "Amazon now has 45,000 robots in its warehouses", Business Insider, Jan. 3, 2017, https://www.businessinsider.com/amazons-robot-army-has-grown-by-50-2017-1 (Year: 2017).

Non Final Office Action received for U.S. Appl. No. 16/867,707 dated Oct. 27, 2022, 20 pages.

Non Final Office Action received for U.S. Appl. No. 17/196,195 dated Jul. 17, 2023, 14 pages.

Non Final Office Action received for U.S. Appl. No. 18/075,095 dated Aug. 2, 2023, 27 pages.

Notice of Allowance received for U.S. Appl. No. 16/867,707 dated Jun. 9, 2023, 13 pages.

Notice of Allowance received for U.S. Appl. No. 16/708,618 dated Aug. 4, 2022, 25 pages.

* cited by examiner

SYSTEMS, METHODS, COMPUTING PLATFORMS, AND STORAGE MEDIA FOR DIRECTING AND CONTROLLING AN AUTONOMOUS INVENTORY MANAGEMENT SYSTEM IN A RETAIL CONTROL TERRITORY

PRIORITY AND CROSS-REFERENCE TO RELATED APPLICATIONS

The present application for patent claims priority to U.S. Provisional Application No. 63/033,686 entitled "SYSTEMS, METHODS, COMPUTING PLATFORMS, AND STORAGE MEDIA FOR DIRECTING AND CONTROLLING AN AUTONOMOUS INVENTORY MANAGEMENT SYSTEM IN A RETAIL CONTROL TERRITORY" filed Jun. 2, 2020, and assigned to the assignee hereof, and the contents of which are incorporated herein by reference in their entirety and for all proper purposes. The present application is related to U.S. Provisional Application Ser. No. 62/986,919 the contents of which are incorporated herein by reference in their entirety and for all proper purposes. The present application is also related to U.S. Non-Provisional application Ser. Nos. 16/708,618; 16/867,707; and Ser. No. 16/867,711, the contents of which are incorporated herein by reference in their entirety and for all proper purposes.

FIELD OF THE DISCLOSURE

The present disclosure relates to systems, methods, computing platforms, and storage media for directing and controlling an autonomous inventory management system in a retail control territory. More specifically, but without limitation, the present disclosure relates to systems, methods, computing platforms, and storage media for dynamically organizing autonomous storage units or robots in a retail control territory.

BACKGROUND

The field of automation is rapidly expanding into non-traditional functions, for instance, within the inventory management systems industry. Automation has become common in numerous applications, including online retail (e.g., warehousing, manufacturing, etc.) and airport luggage handling. In some cases, automation creates distinct advantages including higher uptime and lower revolving costs over the traditional labor force. It is estimated that automation will continue to become more prevalent in performing traditional labor tasks in these, and additional industries in the future.

Current techniques for inventory automation systems include robots with limited intelligence and functionality. In some cases, such robots are configured to dock with specially modified shelves by driving under them, lifting them up, and transporting them from one point to another. While these robots have brought about some advances in inventory handling and transport, the shelves themselves have not evolved much. In other words, the shelves utilized in current warehouse automation systems have no added functionality beyond providing storage space for inventory. It should be noted, however, that these robots are in no way "intelligent", since they are not only unaware of the inventory they are carrying and transporting (e.g., inventory levels of different items), but also any goals or targets pertaining to that inventory (e.g., varying priorities for different inventory requests/demands, sensitivity of inventory to vibrations, temperature, light, etc.). Furthermore, while the use of robots in warehouses and distribution centers is not uncommon, retail locations, such as grocery stores and department stores, have been reluctant to deploy robots in order to provide customers with a personalized shopping experience.

Thus, there is a need for a flexible, intelligent, and autonomous robot that can enhance customer shopping experience in a retail setting, as well as dynamically respond to inventory demands at more than one geographic site based on defined sets of goals and targets.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below. It should be noted that the terms "robot", "autonomous storage unit", "autonomous inventory storage unit", "inventory storage robot", "autonomous inventory robot", or "mobile inventory transportation unit (MITU)" may be used interchangeably throughout this application and may be applied to similar systems outside of the warehouse, retail, and supply chain industry. Further, the terms "transport system", "transportation system", "truck", "transport unit", "transportation unit", "inventory carrier", or "transporter" may be used interchangeably throughout this application. Lastly, the terms "central system", "central server", "control system", "retail controller", or "controller" may be used interchangeably throughout this application.

Some embodiments of the disclosure may be characterized as a system for dynamically organizing autonomous storage units in a retail control territory, the system comprising: one or more hardware processors configured by machine-readable instructions to: identify a plurality of autonomous storage units, wherein each autonomous storage unit comprises: a housing, an inventory storage device physically coupled to the housing, and configured to transport at least one inventory item, a power device, wherein the power device is operationally configured to supply power to electrical components of the autonomous storage unit, a drive device in electrical communication with the power device, the drive device operationally configured to physically move the autonomous storage unit in one or more control territories, including at least the retail control territory, and one or more of: a navigation device operationally configured to transmit and receive geographic data and determine a physical location of the autonomous storage unit, a sensing device operationally configured to detect physical objects and transmit and receive physical object data, and a control device, wherein the control device is in electronic communication with the power device, the drive device, and one or more of the navigation device and the sensing device, and is operationally configured to control the autonomous storage unit; and wherein the one or more hardware processors are further configured by machine readable instructions to: identify an inventory level for the plurality of autonomous storage units, the inventory level comprising at least a number and description of one or more inventory items held by the plurality of autonomous storage units; determine a first arrangement for the plurality of autonomous storage units based in part on one or more first factors; organize the plurality of autonomous storage units in the first arrangement; identify one or more second factors; determine a second arrangement for at least a portion of the plurality of autonomous storage units based on the one or more second factors; and direct the at least the portion of the plurality of autonomous storage units to organize in the second arrangement.

Some embodiments of the disclosure may be characterized as a method for dynamically organizing autonomous storage units in a retail control territory, the method comprising: identifying a plurality of autonomous storage units, wherein each autonomous storage unit is configured to hold one or more inventory items; identifying an inventory level for each of the plurality of autonomous storage units, the inventory level comprising at least a number and description of the one or more inventory items held by the plurality of autonomous storage units; determining a first arrangement for the plurality of autonomous storage units based in part on one or more first factors; organizing the plurality of storage units in the first arrangement; identifying one or more second factors; determining a second arrangement for at least a portion of the plurality of autonomous storage units based on the one or more second factors; and directing the at least the portion of the plurality of autonomous storage units to organize in the second arrangement. In some examples, each of the one or more autonomous storage units comprises a housing, an inventory storage device physically coupled to the housing, and configured to transport the one or more inventory items, a power device, wherein the power device is operationally configured to supply power to electrical components of the autonomous storage unit, a drive device in electrical communication with the power device, the drive device operationally configured to physically move the autonomous storage unit in one or more control territories, including at least the retail control territory, and one or more of: a navigation device operationally configured to transmit and receive geographic data and determine a physical location of the autonomous storage unit, a sensing device operationally configured to detect physical objects and transmit and receive physical object data, and a control device, wherein the control device is in electronic communication with the power device, the drive device, and one or more of the navigation device and the sensing device, and is operationally configured to control the autonomous storage unit.

Some other embodiments of the disclosure may be characterized as a non-transient computer-readable storage medium having instructions embodied thereon, the instructions being executable by one or more processors to perform a method for dynamically organizing autonomous storage units in a retail control territory, the method comprising: identifying a plurality of autonomous storage units, wherein each autonomous storage unit is configured to hold one or more inventory items; identifying an inventory level for each of the plurality of autonomous storage units, the inventory level comprising at least a number and description of the one or more inventory items held by the plurality of autonomous storage units; determining a first arrangement for the plurality of autonomous storage units based in part on one or more first factors; organizing the plurality of storage units in the first arrangement; identifying one or more second factors; determining a second arrangement for at least a portion of the plurality of autonomous storage units based on the one or more second factors; and directing the at least the portion of the plurality of autonomous storage units to organize in the second arrangement. In some examples, each of the one or more autonomous storage units comprises a housing, an inventory storage device physically coupled to the housing, and configured to transport the one or more inventory items, a power device, wherein the power device is operationally configured to supply power to electrical components of the autonomous storage unit, a drive device in electrical communication with the power device, the drive device operationally configured to physically move the autonomous storage unit in one or more control territories, including at least the retail control territory, and one or more of: a navigation device operationally configured to transmit and receive geographic data and determine a physical location of the autonomous storage unit, a sensing device operationally configured to detect physical objects and transmit and receive physical object data, and a control device, wherein the control device is in electronic communication with the power device, the drive device, and one or more of the navigation device and the sensing device, and is operationally configured to control the autonomous storage unit.

In some examples of the method, system, and non-transient computer-readable storage medium described above the one or more second factors are associated with at least one event. Some examples of the method, system, and non-transient computer readable medium described above may further include processes, features, means, or instructions for detecting the at least one event, the at least one event comprising: a user entering the retail control territory, an inventory item pick up event, the inventory item pick up event comprising removal of an inventory item from one of the plurality of autonomous storage units, an inventory level for one of the plurality of autonomous storage units falling below a threshold, receiving one or more messages from a central server, or a combination thereof.

Some examples of the method, system, and non-transient computer readable medium described above may further include processes, features, means, or instructions for identifying a user identity for the user; and estimating, for the user, a likelihood of purchasing the one or more inventory items held by the plurality of autonomous storage units, wherein the estimating is based on a past buying pattern of the user. In some examples of the method, system, and non-transient computer-readable storage medium described above the determining the second arrangement is further based on the estimating.

Some examples of the method, system, and non-transient computer readable medium described above may further include processes, features, means, or instructions for determining one or more inventory item pick up events for at least one autonomous storage unit of the plurality of autonomous storage units, wherein each inventory item pick up event is linked to a respective inventory item; storing an indication of the one or more inventory item pick up events; correlating one or more inventory items checked out by a user to the one or more inventory items linked to the one or more inventory item pick up events; determining, based on the correlating, a discrepancy; and transmitting, based on the determined discrepancy, an alert to one or more of a central server and a human operator. In some cases, the central server may be an example of a retail territory controller (also referred to as retail controller), further described in relation to FIGS. 6-9.

Some examples of the method, system, and non-transient computer readable medium described above may further include processes, features, means, or instructions for identifying a user identity for the user, wherein the user identity is associated with a user profile stored in a user profile database, wherein the user profile comprises one or more of a name, age, email address, phone number, residential address, payment information, the payment information comprising one or more of credit card information and digital wallet information, and past buying patterns for the user; billing the user based in part on the determining the one or more inventory item pick up events and the user identity; and updating an inventory level for the at least one autonomous storage unit, wherein the updating is based in part on the determining the one or more inventory item pick up events.

In some examples of the method, system, and non-transient computer-readable storage medium described above determining an inventory pick up event comprises identifying, via a built-in weighing scale, a weight change at the at least one autonomous storage unit. In some cases, determining the inventory item pick up event further comprises correlating the weight change to an inventory item in an inventory item database.

In some examples of the method, system, and non-transient computer-readable storage medium described above the at least one autonomous storage unit comprises one or more of an image recognition device and a radio frequency identification (RFID) reader. In some examples of the method, system, and non-transient computer-readable storage medium described above determining an inventory item pick up event comprises one or more of: identifying, via the image recognition device, the respective inventory item; and scanning, by the RFID reader, a RFID tag affixed to the respective inventory item; and correlating the RFID tag to an inventory item in an inventory item database.

In some examples of the method, system, and non-transient computer-readable storage medium described above the retail control territory comprises the central server and one or more of a radio frequency identification (RFID) reader, an image recognition device, a Bluetooth transceiver, and a near field communication transceiver. In some examples of the method, system, and non-transient computer readable storage medium described above, identifying the user identity is based at least in part on one or more of a facial recognition of the user, a walking pattern of the user, an iris scan of the user, a voice recognition of the user, a RFID tag linked to the user, a Bluetooth identification of a mobile device linked to the user, and near field communication (NFC) identification of the mobile device or a payment card linked to the user.

In some examples of the method, system, and non-transient computer-readable storage medium described above at least one autonomous storage unit is configured to process payments based in part on receiving a credit card, digital wallet, check, cash, or cryptocurrency wallet from a user.

In some examples of the method, system, and non-transient computer-readable storage medium described above the one or more first factors comprise one or more of: a time, information pertaining to ad spaces sold or leased in the retail control territory, historical buying patterns for one or more users in the retail control territory, historical selling patterns at the retail control territory, and information pertaining to inventory items in stock at the retail control territory, wherein the information pertaining to inventory items in stock at the retail control territory comprises inventory levels, discounts, expiration dates, or a combination thereof.

In some examples of the method, system, and non-transient computer-readable storage medium described above the one or more second factors comprise one or more of: performance results associated with the first arrangement, a time, information pertaining to ad spaces sold or leased, historical buying patterns for one or more users in the retail control territory, historical selling patterns at the retail control territory, and information pertaining to inventory items in stock at the retail control territory, wherein the information pertaining to inventory items in stock at the retail control territory comprises inventory levels, discounts, expiration dates, or a combination thereof. In some cases, the one or more first factors and the one or more second factors may be the same or different. In some embodiments, the performance results associated with the first arrangement comprise one or more of a revenue, profits, number of customers served, and a number of inventory items sold, to name a few non-limiting examples. In some cases, the number of inventory items sold may be per each autonomous storage unit in the first arrangement. Alternatively, the number of inventory items sold may be cumulative for all the autonomous storage units in the first arrangement.

Some examples of the method, system, and non-transient computer readable medium described above may further include processes, features, means, or instructions for identifying one or more ad spaces in the retail control territory, the one or more ad spaces associated with at least a portion of the one or more inventory items held by the plurality of autonomous storage units, wherein the at least the portion of the one or more inventory items are associated with one or more manufacturers that have bought or leased ad spaces in the retail control territory. In some cases, a retail store or retail control territory may buy or lease ad spaces (e.g., end-cap aisle spaces) to manufacturers based on a bidding process. For instance, the highest bidder for a given ad space may be granted the rights to have their products (i.e., inventory items) placed in the ad space. In some cases, an ad space may be leased for a pre-defined duration of time (e.g., for the month of January, for the whole year, for a week, etc.). Alternatively, ad spaces may be leased for a particular slot of time (e.g., 8 am to 10 am on Monday-Friday, 6 pm-9 pm every day, etc.). In some examples of the method, system, and non-transient computer-readable storage medium described above the determining the one or more of the first arrangement and the second arrangement is further based on identifying the one or more ad spaces.

In some examples of the method, system, and non-transient computer-readable storage medium described above at least one autonomous storage unit of the plurality of autonomous storage units comprises one or more of a mirror and a visual display. In some cases, the plurality of autonomous storage units may be configured to organize or arrange in a third arrangement, the third arrangement comprising an enclosed area (e.g., a rectangular area resembling a changing room, where the autonomous storage units form the "walls" of the changing room).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
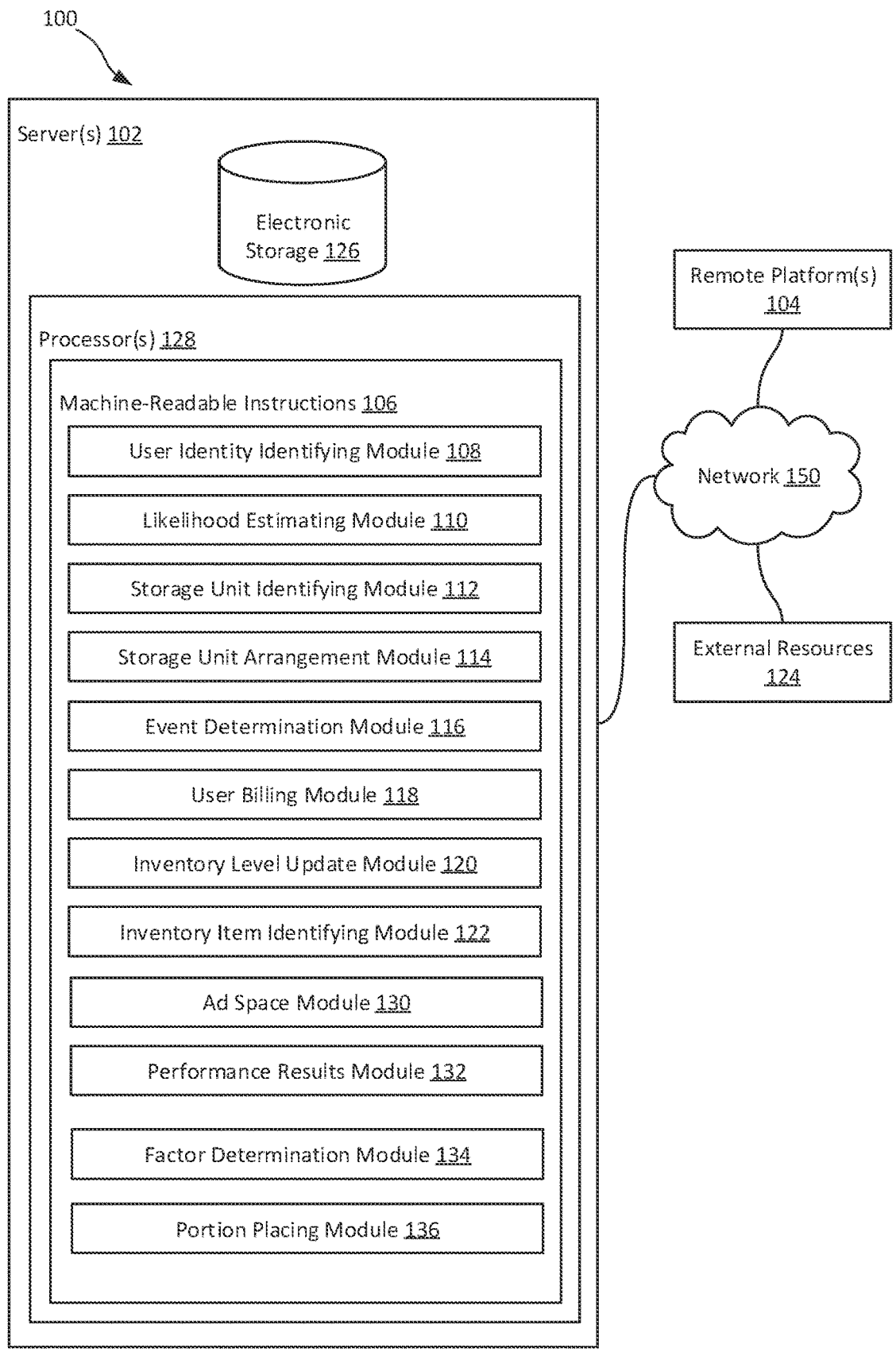
FIG. 1 illustrates a system configured for directing and controlling an autonomous inventory management system in a retail control territory, in accordance with one or more implementations.

The words "for example" is used herein to mean "serving as an example, instance, or illustration." Any embodiment described herein as "for example" is not necessarily to be construed as preferred or advantageous over other embodiments.

Robots are ubiquitous in manufacturing and warehouses. In some situations, they are deployed to move goods or inventory items between two points at a single geographic location, such as a warehouse. For instance, current inventory automation systems utilize robots that are configured to dock with specially modified shelves by driving under them, lifting them up, and transporting them from one point to another within a warehouse. It should be noted, however, that robots utilized in current inventory automation systems are limited in their intelligence, since they are not only unaware of the inventory they are carrying and transporting (e.g., inventory levels of different items), but also any goals or targets pertaining to that inventory (e.g., varying priorities for different inventory requests/demands, sensitivity of inventory to vibrations, temperature, light, etc.). Furthermore, while robots have brought at least some advances in inventory handling and transport, the shelves themselves have remained primitive. In some regards, the shelves transported by robots in current warehouse systems have no added functionality beyond providing storage space for inventory. The combination of primitive shelves together with robots having limited intelligence has prevented robots from playing a role in retail settings or environments. In fact, retail stores, including grocery stores and department stores, have been reluctant to deploy robots used in warehouses to their spaces (i.e., spaces frequented by customers).

In order to address the deficiencies in the current technology, the Applicant's disclosure is directed to a system and a method for directing and controlling an autonomous inventory management system in a retail control territory. The present disclosure generally relates to the directing and controlling of autonomous inventory storage units (also referred to as autonomous robots) in a retail control territory in order to provide a personalized shopping experience to customers. In some cases, the autonomous inventory storage unit may be an example of the storage unit or Mobile Inventory Transportation Unit (MITU) described in U.S. Provisional Application Ser. No. 62/986,919, the contents of which are incorporated herein by reference in their entirety and for all proper purposes.

In some cases, autonomous robots may be deployed to transport inventory items from a first geographic location (e.g., a warehouse in a city) to a second geographic location (e.g., a retail store in the city), for instance, in response to inventory demands at the second location. In some embodiments, a controller or central server in the retail store may receive information pertaining to one or more autonomous robots that are being delivered to the retail store. The information may include one or more of autonomous robot credentials (e.g., unique ID number for each robot) and/or a list of inventory items held by the one or more autonomous robots, including item name, quantity, description, barcodes, Stock Keeping Unit (SKU), and/or Universal Product Code (UPC), to name a few non-limiting examples. The controller or central server may also be aware of the scheduled arrival time of the transportation system carrying the one or more autonomous robots. Additionally or alternatively, the central server at the retail store may track, in real-time, the transportation system and/or the autonomous robots. Real-time tracking may allow the controller or other systems at the retail store to make arrangements for receiving the autonomous robots, which may include management of staging space in the back of the store, instructing autonomous robots currently operating in the retail store to return to the back of store to swap out with new arrivals, etc.

In some cases, the store may comprise a warehouse or storage space, where the warehouse may further include a picking station. In such cases, autonomous robots may not need to relocate back to the warehouse at the first geographic location, since inventory replenishment could take place at the retail store itself. For instance, a robot may be configured to relocate to the picking station in the warehouse (or storage space) in the retail store once it determines its inventory level has fallen below a threshold (e.g., using a weight sensor, barcode readings, or through any other means). In other cases, the robot may receive instructions from the central system in the retail store that its inventory needs to be replenished. In some cases, the autonomous robot may be loaded at the picking station by a shelf stacker. It should be noted that the shelf stacker may be a worker employed at the warehouse/retail store or may be an automated robot that is configured to load/unload autonomous storage robots. In some examples, if the shelf stacker is in front of the autonomous robot, the autonomous robot may be configured to highlight the part of each shelf that needs replenishment, as well as the quantity of the inventory items. In some aspects, the techniques described above may streamline restocking of inventory items at retail stores, since the number of shelf stackers needed to restock an entire store could be kept to a minimum. Furthermore, besides saving on costs by employing fewer shelf stackers, autonomous robots may also reduce the risk of physical injury to shelf stackers, since shelf stackers may not need to lift or push heavy pallets of inventory items up and down aisles of the retail store.

In some cases, in addition to delivering the inventory items, autonomous robots may also be employed with one or more tasks at the retail store. In some circumstances, a retail store may employ multiple autonomous robots that are moveable and configured to optimize customer experience. In some cases, optimizing customer experience may include one or more of: presenting items or goods that a customer is likely to buy, suggesting new items based on prior shopping history, expediting check out process by directly billing the customer or providing payment processing at the robot (e.g., the robot may be configured to accept credit cards, digital wallets, cryptocurrencies, etc.), and arranging autonomous robots in different configurations (e.g., an enclosed area representing a changing room), to name a few non-limiting examples.

In some cases, one or more of statistical modeling, machine learning and/or deep learning, neural networks, and artificial intelligence may be utilized to enhance the efficiency of the system. In one example, a cloud computing platform may perform statistical modeling or execute artificial intelligence algorithms on data received from one or more autonomous robots operating within the retail store, which may assist in optimizing customer experience. Furthermore, the cloud computing platform may transmit regular updates (e.g., software) to the one or more autonomous robots to enhance their ability to provide a customized shopping experience. In some cases, the data received from the one or more autonomous robots may include one or more of: user profiles, including a payment profile for each user, historical selling patterns at the retail store, prior shopping history for different user profiles, etc. In some examples, prior shopping history for a user profile may include a list of products bought by the user, brands and/or size (i.e., for clothing items), a list of items returned by the user, online reviews and ratings (if any) for items purchased by the user, etc.

In some embodiments, autonomous robots operating in a retail control territory may be configured to reorganize or rearrange themselves based on the users or customers in the retail control territory, inventory in stock at the retail control territory, etc., further described in relation to FIGS. 6-9. In some cases, different stores may deploy different degrees of reorganization, where the degree of reorganization may be set by a central system or server in the retail control territory. As an example, autonomous robots operating in a retail store 'A' may only assemble in certain designated areas in the retail store. For instance, autonomous robots in the retail store 'A' may only arrange in an aisle formation in the condiments and pasta aisles of the retail store. These autonomous robots may present various types of condiments and/or pastas to customers walking through those aisles. Although not necessary, in some cases, the various types of pastas and condiments presented may be based on prior shopping history (e.g., aggregate shopping history at the retail store, shopping history for one or more specific customers). In another example, autonomous robots operating in a retail store 'B' may have a higher level of autonomy than those in retail store 'A' and may be allowed to assemble in all publicly accessible areas of the retail store 'B'. For example, in addition to assembling in an aisle formation, autonomous robot(s) in retail store 'B' may be permitted to arrange near the front of the store (e.g., for online store pick-up), near a check-out aisle, etc.

In some cases, the resolution of customization in a store may be based on an average and self-organizing structure for robot positioning in the store. In other cases, the resolution of customization may be selected from among a plurality of strategies for robot positioning in the store. The resolution of customization may be controlled by a controller (e.g., shown as retail controller 805 in FIG. 8, retail controller 905 in FIG. 9) in the retail control territory. In some cases, the resolution may be at a customer level, where the arrangement of autonomous robots and inventory items displayed may vary from customer to customer. Alternatively, the resolution may be at a store level, for instance, based on historical selling patterns at the store. In some embodiments, facial recognition technology may be utilized in the retail control territory to identify customers entering the store. Following identification, the retail territory controller may direct one or more autonomous robots to reorganize in an optimized configuration for that customer, which may facilitate in increasing sales or revenue generated from that customer. In some circumstances, a retail control territory may comprise a plurality of autonomous robot aisles, where each aisle is customized for one or more customers. Autonomous robot aisles may vary (e.g., in length and/or width, inventory items held, etc.) based on a number of factors, including the store or retail control territory, identified customer and past buying patterns, inventory items to be displayed, estimated purchase for the customer (e.g., number of items, final bill), etc., to name a few non-limiting examples. In one example, a grocery store in a retail control territory may place a high pull item, like milk, towards the end of a customer's aisle, thus compelling the customer to walk to the end of aisle and view additional products or items. Similarly, the spacing between autonomous robots arranged in an aisle formation or another formation (e.g., a square, circle, rectangle, etc.) may be varied based on one or more of the factors described above. In other words, the present disclosure may support a high level of granularity with regards to the different strategies for organizing autonomous robots in a retail control territory.

In some cases, such as in clothing or department stores, autonomous robots may be employed to provide a private and customized shopping experience to customers. In one example, a retail controller in a clothing store may direct autonomous robots to arrange in an enclosed area resembling a changing room. In some cases, the autonomous robots may comprise one or more of a mirror, a visual display, shelves, hanging racks, etc., which may be arranged within the enclosed area. Additionally or alternatively, one or more mirror, shelves, and hanging racks may be arranged outside the enclosed area, making them available for use by other customers or staff at the store. In some embodiments, autonomous robots may be configured to carry clothing items, including shirts, pants, socks, etc., based on a customer's prior shopping history, which may consider one or more of: brands or labels previously bought by the customer, sizes, colors and/or patterns (if applicable), price point (e.g., customer usually buys t-shirts under $20, jeans under $100, etc.). In some cases, the autonomous robot may also carry inventory items that the customer is likely to buy, which may be based on comparing an estimated probability to a probability threshold (e.g., 60%) set by the autonomous robot, retail territory controller, or another central server or system. As an example, based on the customer's prior shopping history for t-shirts, one or more of an autonomous robot and retail territory controller may estimate a customer's likelihood of purchasing a brand of t-shirt never purchased by the customer before to be 70%. In such cases, the autonomous robot may be configured to present the t-shirt brand to the customer based on comparing the estimated probability (i.e., 70%) to a probability threshold (e.g., 60%). In some cases, autonomous robots or central systems may estimate the likelihood of a customer purchasing an item based on a level of interest or behavior of the person as products are displayed to them, which may involve analyzing the customer's eyes, facial expressions, time spent with the product, etc. In some cases, the retail territory controller or an autonomous robot may refine the products to be displayed to a customer by using a combination of the actual buying patterns of the customer with the interest behavior, which may serve to maximize revenue or profit for the store. In some instances, an autonomous robot may comprise one or more cameras and visual displays (e.g., in addition to or in lieu of a mirror). Further, the autonomous robot may employ augmented reality (AR) technology to provide a customer with a visual representation of themselves in an outfit, for instance. In some cases, the autonomous robot may monitor one or more gestures (e.g., hand gestures, such as a swipe motion) or other visual or audible signals from the customer, and perform certain actions based on analyzing the same. As an example, a customer in a changing room formed by one or more autonomous robots may want an item in a different size or color. Further, the customer may swipe their hand to the left or right, for instance, which may be detected by the camera of an autonomous robot. In some cases, the autonomous robot may prompt the user for further instructions (e.g., what color would you like your t shirt, what size) through audible means, text on the visual display, etc. After receiving additional instructions from the user, the autonomous robot may leave the changing room and return with the item requested by the user. Alternatively, the autonomous robot may request another robot holding the requested item to replace its spot in the changing room arrangement.

In some cases, controllers or central systems at different retail stores may collaborate and share autonomous shelf formations or arrangements, such as an aisle pattern (e.g., aisle length), floor configuration (e.g., shape), etc., among each other, for instance, via the cloud computing platform. In this way, purchase rates and revenues at under-performing stores may be enhanced, for instance, by implementing floor configurations from stores having higher purchase rates.

In some embodiments, autonomous robots may serve as a point of sale (POS) within the retail control territory. For instance, an autonomous robot may include payment processing capabilities, such as credit card payments, Near Field Communication (NFC) payments, wire transfers, cryptocurrencies, etc., via one or more of the wireless, Bluetooth, and NFC systems. In some cases, the autonomous robot may also be configured to issue refunds to customers (e.g., if the customer is returning an item). Although not necessary, in some cases, a user or customer may set up a payment account (i.e., upload payment information to a customer profile) with the retail system, or an autonomous storage unit operating within the retail system. In such cases, the autonomous storage unit may utilize one or more of facial recognition technology, a finger-print reader, iris scanner, voice recognition, or any other identification techniques to confirm the user's identity and charge their account accordingly. In some embodiments, customers may be identified as they are entering the store. For instance, a store may have one or more cameras and image recognition units installed near its entrance to identity customers walking into the store. In some cases, at least a portion of the customers may each be linked to a customer or user profile, which may include one or more of a name, shopping history, payment information, age, name, phone number, etc.

In some other cases, the autonomous storage unit may require the user to present a credit card, Europay, Mastercard and Visa (EMV) card, or mobile phone (e.g., if the user has set up a digital wallet) if the user would like to complete their transaction at the autonomous robot. In yet other cases, the user may have pre-authorized robots or autonomous storage units to automatically charge their payment account, for instance, when one or more items are removed from the shelves or when they leave the retail store. In such cases, the autonomous storage unit may charge the user's payment account after confirming the identity of the user (e.g., visual identification, voice recognition, etc.). Alternatively, the autonomous storage unit may charge the user's payment account via NFC payment technology. In some cases, NFC payment technology may require the user to be within a certain distance (e.g., 1 feet, 3 feet, etc.) from the NFC reader of the autonomous storage unit, which may alleviate the risk of accidentally charging other users not associated with the transaction. In some examples, the autonomous storage unit may identify one or more items removed from its shelves and may relay an indication of the same to a cashier or check out system at the retail store. In this way, the cashier may verify the items identified by the storage unit and make any required corrections (e.g., 10 oz packet of potato chips incorrectly identified as 16 oz packet, organic apples incorrectly identified as regular apples, etc.), to the customer's purchase order prior to accepting payment. Besides the financial impacts to the customer and/or the store (i.e., due to overpaying or underpaying by the customer), the corrections input by the cashier may facilitate in improving the inventory item identification capabilities of the autonomous storage unit. In one example, the input received from multiple cashiers or check out stations, along with inventory item identification information from multiple autonomous storage units, may be uploaded to a cloud computing platform utilizing deep learning or artificial intelligence algorithms, which may serve to optimize inventory item identification and checkout at storage units. In some cases, an autonomous storage unit may register when one or more inventory items are removed from its shelves and record the same to a checkout database. In some cases, the autonomous storage unit may also record an identity (e.g., a photo, video) of the customer that removed the inventory items to the checkout database. By correlating the items that were removed by the customer to the items that were actually checked out by the customer, the autonomous storage unit may detect nefarious behavior (i.e., theft). In some cases, the autonomous storage unit may notify security or send an alert when it detects such behavior so that corrective action may be taken.

Figure 4:
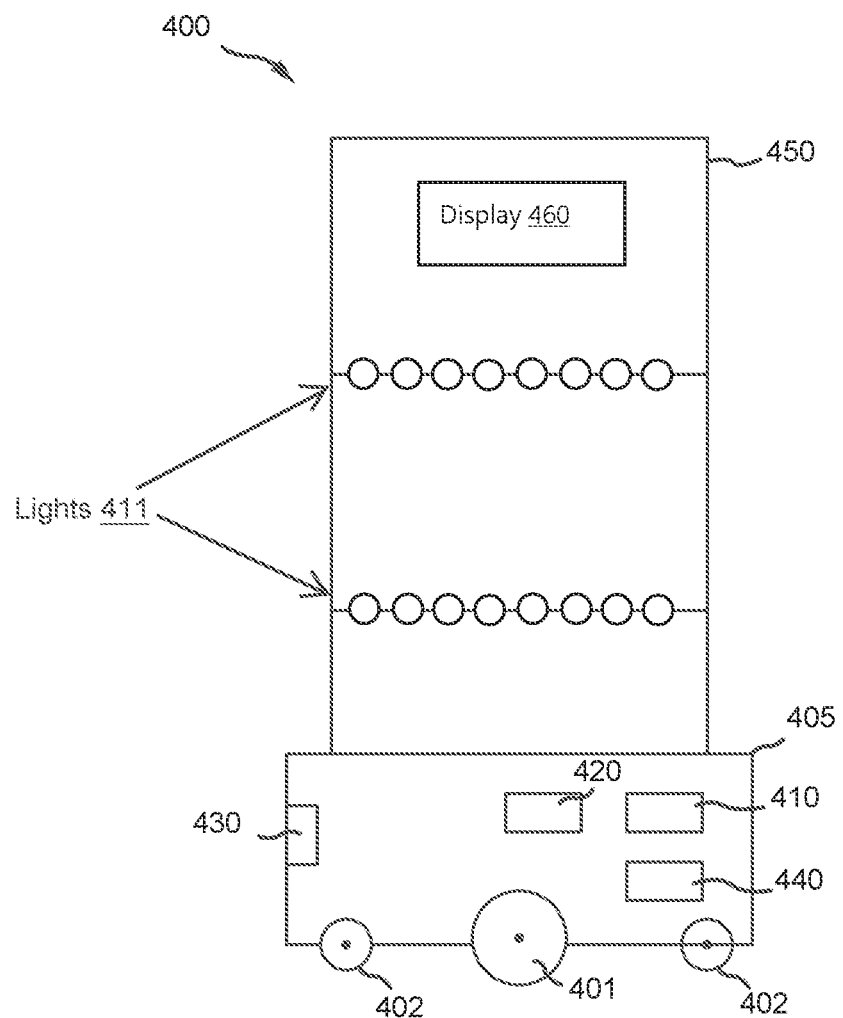
FIG. 4 illustrates an example of an autonomous storage unit, in accordance with one or more implementations.
Figure 5:
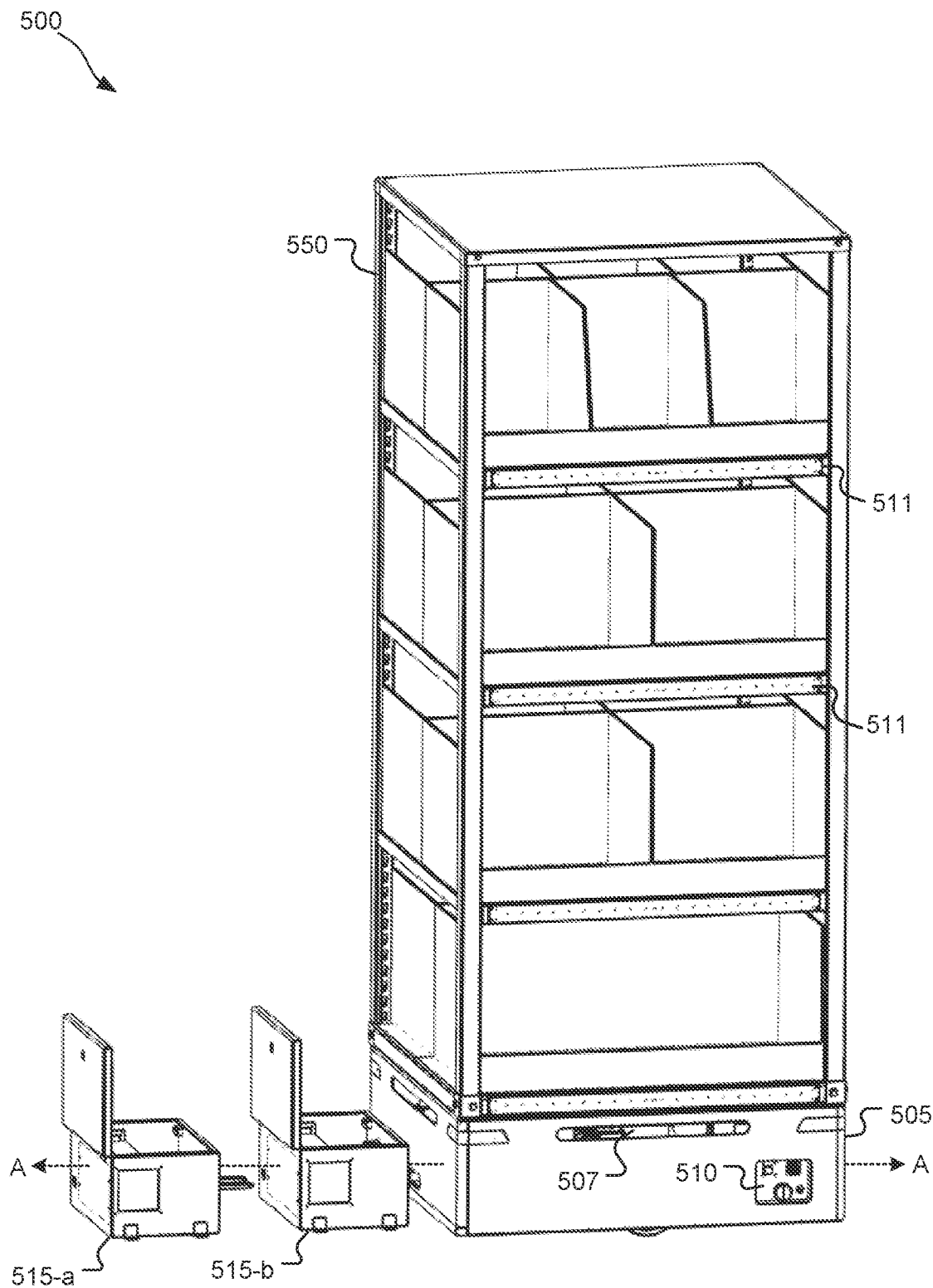
FIG. 5 is a side view of an autonomous storage unit, in accordance with one or more implementations.

As further described in relation to FIGS. 4 and 5, autonomous robots operating in a retail control territory may comprise visual indicators, such as one or more rows of lights (e.g., Light Emitting Diode (LED) lights). In some cases, LED lights may be located underneath and/or above the shelves of an autonomous robot. Further, autonomous robots may be configured to illuminate one or more lights or an entire row of lights, for instance, to highlight spaces on the shelves that a customer is more likely to buy from. In some cases, one or more spaces on the shelves may be highlighted based on analyzing a past buying pattern for the customer. Additionally, or alternatively, the visual indicator may comprise a display (e.g., shown as display 460 in FIG.

4) mounted on the autonomous robot. In some cases, the display may be an example of a Liquid Crystal Display (LCD), a LED display, or another High Definition (HD) display. Furthermore, the autonomous robot may be configured to display one or more of a price, or other key product information such as product specification, nutrition information and/or ingredients (if applicable), or even a product image to a customer facing the display. In some examples, the autonomous robot may comprise one or more buttons adjacent a slot or shelf (e.g., above or below the shelf) on which a product is placed, and a user may view product information on the attached display by clicking the said buttons.

In some embodiments, an autonomous robot may comprise a lockable cabinet for storing big-ticket or high-ticket items, or items needing age verification, such as alcohol, nicotine or tobacco products, and certain medications. In some cases, the autonomous robot may be configured to lock such inventory items behind the cabinet door(s) and control the opening/closing of said doors. In some cases, the cabinet door(s) may be transparent, thus allowing a customer to view the items for sale. In other cases, the autonomous robot may display a list of the inventory items it is holding on the visual display. In one example, if the robot is carrying alcohol, a user or customer may be required to show proof of age before the cabinet doors may be unlocked. In some cases, the robot may confirm the user's age via a combination of an ID scanner on the robot and visual identification (e.g., facial recognition to confirm that the picture on the ID matches the user in front of the robot). In yet other cases, the robot may request a human operator to verify the user's age and unlock the cabinet doors (e.g., using a physical key, a fob, a passcode, fingerprint, or any other means).

Similarly, the lockable cabinet of the autonomous robot may also serve to optimize user experience at retail stores that allow customers to order goods online and pick them up at the store. In some cases, autonomous robots may comprise a plurality of lockers for storing such goods, and users may be able to pick up their goods after confirming their identity. For instance, as described above, autonomous robots may be configured to confirm user/customer identity using one or more means, such as facial recognition, iris scan, fingerprint scan, voice recognition, security key or password, etc. In some examples, after confirming the customer's identity, the robot may unlock a cabinet or shelf carrying the customer's package. In other cases, a master controller (e.g., shown as retail controller 805 in FIG. 8) may transmit a QR code to the customer's mobile device. In such cases, the robot or autonomous storage unit may scan the QR code presented by the user on their mobile device, and unlock the particular cabinet or shelf corresponding to that QR code. In some examples, depleted robots may be periodically replaced based on instructions from a master controller, where the master controller may be located at a warehouse or distribution center, or alternatively, in the retail control territory.

FIG. 1 illustrates a system 100 configured for dynamically organizing autonomous storage units in a retail control territory, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of user identity identifying module 108, likelihood estimating module 110, storage unit identifying module 112, storage unit arrangement module 114, event determination module 116, user billing module 118, inventory level update module 120, inventory item identifying module 122, ad space module 130, performance results module 132, factor determination module 134, portion placing module 136, and/or other instruction modules.

User identity identifying module 108 may be configured to identify a user identity for a user. By way of non-limiting example, identifying the user identity may be based at least in part on one or more of a facial recognition of the user, a walking pattern of the user, an iris scan of the user, a voice recognition of the user, a RFID tag linked to the user, a Bluetooth identification of a mobile device linked to the user, and near field communication (NFC) identification of the mobile device or a payment card linked to the user. In some cases, identifying the user identity of the user may further include accessing a user profile associated with the user, where the user profile may be stored in a user profile database. By way of non-limiting example, the user profile may include one or more of a name, age, email address, phone number, residential address, past buying patterns, and payment information (e.g., credit card information) for the user.

Likelihood estimating module 110 may be configured to estimate, for the user, a likelihood of purchasing one or more inventory items in stock at the retail control territory. Estimating the likelihood of purchasing the one or more inventory items may be based in part on a past buying pattern of the user.

Storage unit identifying module 112 may be configured to identify a plurality of autonomous storage units operating in the retail control territory. In some cases, each autonomous storage unit may be configured to hold one or more inventory items.

Storage unit arrangement module 114 may be configured to arrange or organize one or more of the plurality of autonomous storage units based on one or more factors. In some embodiments, the storage unit arrangement module 114 may be configured to work in conjunction with one or more of the event determination module 116, ad space module 130, performance results module 132, and/or the factor determination module 134. In some cases, the storage unit arrangement module 114 may be configured to determine a first arrangement for the plurality of autonomous storage units based in part on one or more first factors; and determine a second arrangement for the plurality of autonomous storage units based on one or more second factors. In some cases, the first arrangement may be different from the second arrangement (e.g., inventory items held by the autonomous storage units in the first and second arrangement may be different; shape of arrangement, such as aisle vs 'L' shape; different aisle lengths; different locations within the retail control territory, etc.). In some examples, the one or more first and second factors may be identified by the factor determination module 134, or any of the other modules described herein. Additionally or alternatively, the storage unit arrangement module 114 may be configured to determine one or more of the first arrangement and the second arrangement based on one or more ad spaces sold (or alternatively, leased) in the retail control territory, further described in relation to FIGS. 8 and 9.

In some examples, at least one autonomous storage unit of the one or more autonomous storage units may include a mirror and/or a visual display. Further, arranging or organizing the one or more autonomous storage units may include directing the one or more autonomous storage units to assemble in a pre-configured formation, such as an enclosed area representing a changing room. Alternatively, arranging or organizing the one or more autonomous storage units may include directing the one or more autonomous storage units to assemble in an aisle formation. In some cases, arranging or organizing the one or more autonomous storage units may further include determining an aisle length and/or an aisle spacing (e.g., spacing between adjacent storage units). By way of non-limiting example, the aisle length and/or aisle spacing may be based at least in part on a past buying pattern of a user, statistical modeling of historic selling patterns at the retail control territory, or a combination thereof. It should be noted that other arrangements besides an aisle, square/rectangle, circle, and changing room are contemplated in different embodiments, and the examples described in this disclosure are not intended to be limiting.

Event determination module 116 may be configured to identify at least one event in the retail control territory, wherein the at least one event comprises a user entering the retail control territory; an inventory item pick up event, the inventory item pick up event comprising removal of an inventory item from one of the plurality of autonomous storage units; detecting that an inventory level for at least one autonomous storage unit is below a threshold; receiving, at an autonomous storage unit, one or more messages from a central server; or a combination thereof. In some cases, the one or more messages may comprise an indication of the second arrangement. Additionally or alternatively, each inventory item pick up event may be linked to a respective inventory item. Further, determining an inventory item pick up event may include one or more of scanning, by the RFID reader, a RFID tag affixed to the respective inventory item; scanning a barcode of the inventory item that was picked up; and/or detecting a weight change at the autonomous robot using a built-in weighing scale. Other techniques for determining an inventory item pick up event are contemplated in different embodiments. For instance, an autonomous storage unit may comprise a camera (e.g., in lieu of a barcode reader), where the camera may be configured to recognize a bar code of an inventory item that was picked up. Alternatively, the camera may be configured to perform visual object recognition (i.e., computer vision) to identify an item that was picked up. In some cases, determining an inventory item pick up event may include correlating the RFID tag, photo, barcode, weight, etc., of the respective inventory item to a corresponding item in an inventory item database. It should be noted that one or more of the inventory item pick up techniques described above may be used in combination, which may serve to enhance the accuracy of the system. In some cases, the event determination module 116 is configured to work in conjunction with the inventory item identifying module 122 and/or the factor determination module 134. In some examples, the event determination module 116 may be further configured to store an indication of the one or more inventory item pick up events.

User billing module 118 may be configured to bill the user based at least in part on the determining the inventory item pick up event. Additionally or alternatively, the user billing module 118 may be configured to process payments (e.g., credit card) from the user. In some cases, the user billing module 118 may be configured to correlate one or more inventory items checked out by a user to the one or more inventory items linked to the one or more inventory item pick up events. Further, the user billing module 118 may be configured to determine, based on the correlating, a discrepancy. In some cases, the user billing module 118 or any of the other modules described herein may transmit, based on the determined discrepancy, an alert to one or more of a central and a human operator so that corrective action may be taken.

Inventory level update module 120 may be configured to update an inventory level for the at least one autonomous storage unit. In some cases, the updating may be based in part on one or more of: determining the inventory item pick up event; and the billing.

Inventory item identifying module 122 may be configured to identify, via the image recognition device, the respective inventory item. In some cases, the inventory item identifying module 122 may provide the identification information for an inventory item to one or more of the inventory level update module 120 and/or the event determination module 116. Other techniques besides image recognition are contemplated in different embodiments and described throughout this disclosure. In some cases, one or more of the inventory item identifying module 122 and the inventory level update module 120 may be configured to identify an inventory level for the plurality of autonomous storage units, the inventory level comprising at least a number and description of one or more inventory items held by the plurality of autonomous storage units.

Ad space module 130 may be configured to identify one or more ad spaces in the retail control territory, the one or more ad spaces associated with at least a portion of the one or more inventory items held by the plurality of autonomous storage units, wherein the at least the portion of the one or more inventory items are associated with one or more manufacturers. In other cases, the one or more ad spaces may be associated with inventory items currently in stock at the retail control territory. In some embodiments, determining one or more of the first arrangement and the second arrangement may be further based on identifying the one or more ad spaces.

Performance results module 132 may be configured to determine performance results associated with autonomous storage unit arrangements. For instance, the performance results module 132 may be configured to determine performance associated with the first arrangement, where the performance results comprise one or more of a revenue, profits, number of customers served, and/or number of inventory items sold, to name a few non-limiting examples. As noted above, different retail control territories may collaborate and share performance results for different storage unit arrangements. In some cases, the retail controller may evaluate the performance results for one or more previous arrangements (i.e., at the same or a different retail store) prior to determining a new arrangement. In other words, the one or more factors (e.g., second factors) used to determine a storage unit arrangement (e.g., second arrangement) may be based on performance results associated with a previous arrangement (e.g., first arrangement).

Factor determination module 134 may be configured to determine one first factors for a first autonomous storage unit arrangement; and one or more second factors for a second autonomous storage unit arrangement. In some cases, the factor determination module 134 may relay this information to one or more of the other modules described herein, including at least the storage unit arrangement module 114. In some cases, the one or more first factors comprise one or more of: a time, information pertaining to ad spaces sold or leased, historical buying patterns for one or more users in the retail control territory, historical selling patterns at the retail control territory, and information pertaining to inventory items in stock at the retail control territory, wherein the information pertaining to inventory items in stock at the retail control territory comprises inventory levels, discounts, expiration dates, or a combination thereof. The one or more second factors may be similar or substantially to the one or more first factors but may additionally include performance results associated with the first arrangement.

Portion placing module 136 may be configured to place at least a portion of the one or more inventory items (e.g., in stock at the retail control territory) in one or more autonomous storage units. In some cases, the placing may be based in part on historical selling patterns at the retail control territory (or retail store), time of day, and/or buying history for one or more users in the retail control territory, to name three non-limiting examples. In other cases, the placing may be based on sold or leased ad spaces (e.g., end-cap aisle ad spaces) at the retail control territory. For instance, a first manufacturer may have leased an end-cap aisle ad space from 8 to 10 am, while a second manufacturer may have leased the end-cap aisle ad space from 10 am to Noon. In such cases, the portion placing module 136 may place inventory items associated with the second manufacturer in an autonomous storage unit at or near 10 am, so the autonomous storage unit can replace the end-cap aisle location occupied by another storage unit holding the inventory items associated with the first manufacturer. In other cases, one or more of the storage unit identifying module 112 and the storage unit arrangement module 114 may instruct the two autonomous storage units to trade spots, for instance, upon identifying that the autonomous storage units are already operating in the retail space (i.e., the space frequented by customers, not the loading/storage area at the back of the store).

In some implementations, by way of non-limiting example, the retail control territory may include a central server (e.g., shown as retail controller 605 in FIG. 6) and one or more of a radio frequency identification (RFID) reader, an image recognition device, a Bluetooth transceiver, and an NFC transceiver. In some implementations, an autonomous storage unit may include one or more of an image recognition device and a RFID reader. In some implementations, by way of non-limiting example, the payment information for a user may include credit card information, digital wallet information, and/or cryptocurrency information specific to the user.

In some implementations, server(s) 102, client computing platform(s) 104, and/or external resources 124 may be operatively linked via one or more electronic communication links. For example, such electronic communication links may be established, at least in part, via a network 150 such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute modules 108, 110, 112, 114, 116, 118, 120, 130, 132, 134, and/or 136, and/or other modules. Processor(s) 128 may be configured to execute modules 108, 110, 112, 114, 116, 118, 120, 130, 132, 134, and/or 136, and/or other modules by software; hardware; firmware; some combination of software, hardware, and/or firmware; and/or other mechanisms for configuring processing capabilities on processor(s) 128. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 130, 132, 134, and/or 136 are illustrated in FIG. 1 as being implemented within a single processing unit, in implementations in which processor(s) 128 includes multiple processing units, one or more of modules 108, 110, 112, 114, 116, 118, 120, 130, 132, 134, and/or 136 may be implemented remotely from the other modules. The description of the functionality provided by the different modules 108, 110, 112, 114, 116, 118, 120, 130, 132, 134, and/or 136 described below is for illustrative purposes, and is not intended to be limiting, as any of modules 108, 110, 112, 114, 116, 118, 120, 130, 132, 134, and/or 136 may provide more or less functionality than is described. For example, one or more of modules 108, 110, 112, 114, 116, 118, 120, 130, 132, 134, and/or 136 may be eliminated, and some or all of its functionality may be provided by other ones of modules 108, 110, 112, 114, 116, 118, 120, 130, 132, 134, and/or 136. As another example, processor(s) 128 may be configured to execute one or more additional modules that may perform some or all of the functionality attributed below to one of modules 108, 110, 112, 114, 116, 118, 120, 130, 132, 134, and/or 136.

Figure 2A:
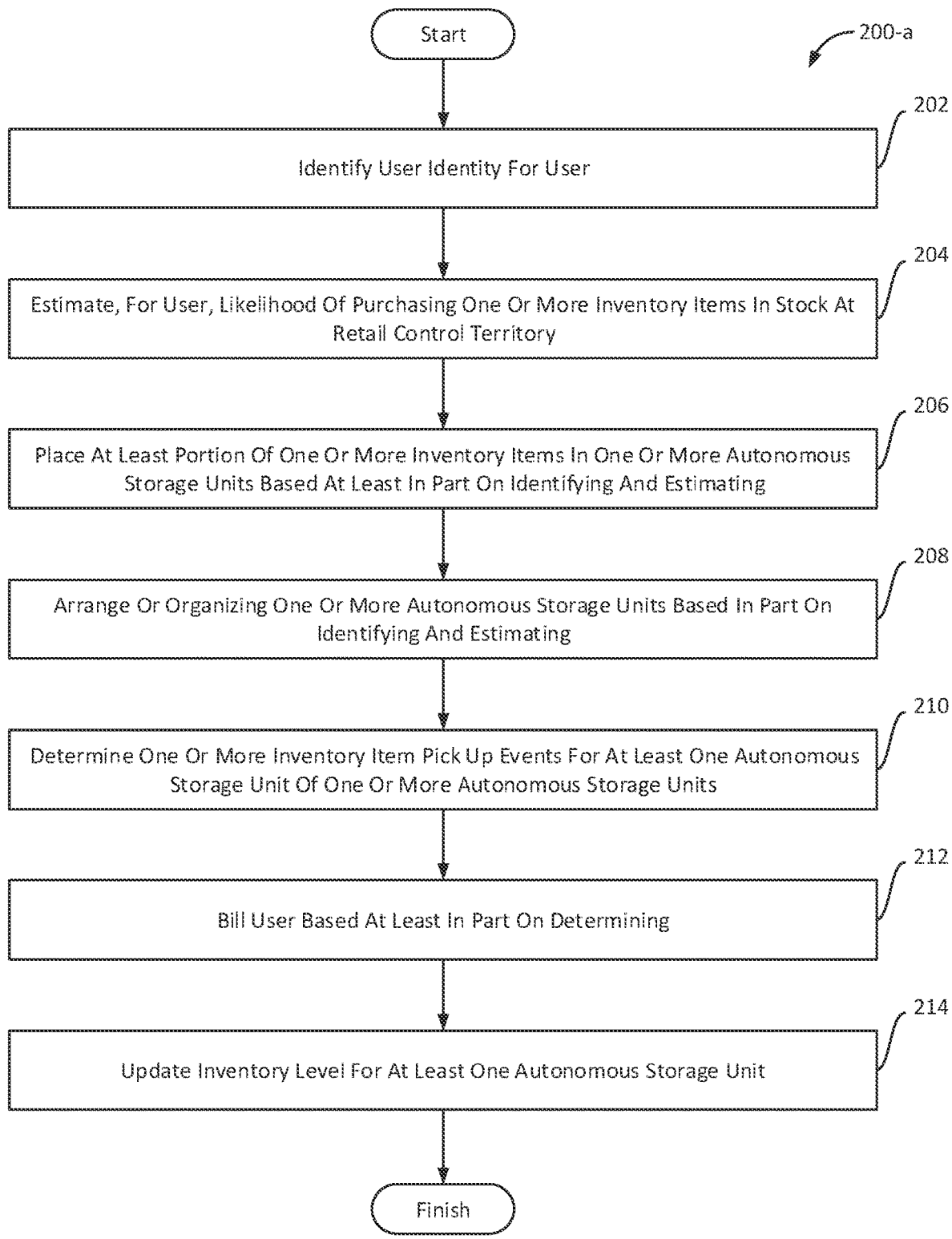
FIG. 2A illustrates a method for directing and controlling an autonomous inventory management system in a retail control territory, in accordance with one or more implementations.
Figure 2B:
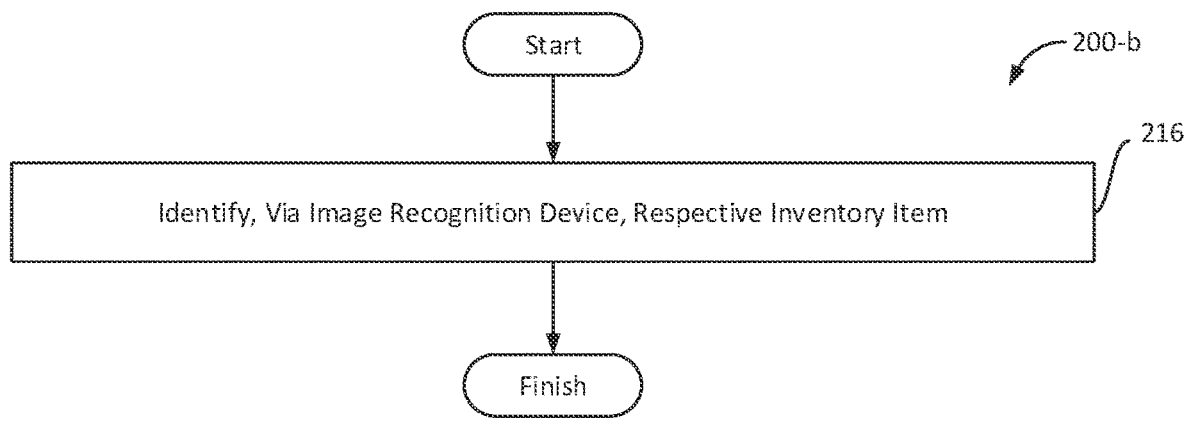
FIG. 2B illustrates a method for directing and controlling an autonomous inventory management system in a retail control territory, in accordance with one or more implementations.

FIGS. 2A and 2B illustrate methods 200-a and 200-b, respectively, for directing and controlling an autonomous inventory management system in a retail control territory, in accordance with one or more implementations. The operations of methods 200-a and 200-b presented below are intended to be illustrative. In some implementations, methods 200-a and 200-b may be accomplished with one or more additional operations not described, and/or without one or more of the operations discussed. Additionally, the order in which the operations of methods 200-a and 200-b are illustrated in FIGS. 2A and 2B, respectively, and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

FIG. 2A illustrates method 200-a, in accordance with one or more implementations.

A first operation 202 may include identifying a user identity for a user. First operation 202 may be performed by one or more hardware processors configured by machine-readable instructions including a module that is the same as or similar to user identity identifying module 108, in accordance with one or more implementations.

A second operation 204 may include estimating, for the user, a likelihood of purchasing one or more inventory items in stock at the retail control territory. Second operation 204 may be performed by one or more hardware processors configured by machine-readable instructions including a module that is the same as or similar to likelihood estimating module 110, in accordance with one or more implementations.

A third operation 206 may include placing at least a portion of the one or more inventory items in stock at the retail control territory in one or more autonomous storage units based at least in part on the identifying and the estimating. Third operation 206 may be performed by one or more hardware processors configured by machine-readable instructions including a module that is the same as or similar to portion placing module 136, in accordance with one or more implementations.

A fourth operation 208 may include arranging or organizing the one or more autonomous storage units based in part on the identifying and the estimating. Fourth operation 208 may be performed by one or more hardware processors configured by machine-readable instructions including a module that is the same as or similar to storage unit arrangement module 114, in accordance with one or more implementations.

A fifth operation 210 may include determining one or more inventory item pick up events for at least one autonomous storage unit of the one or more autonomous storage units. Each inventory item pick up event may be linked to a respective inventory item. Fifth operation 210 may be performed by one or more hardware processors configured by machine-readable instructions including a module that is the same as or similar to event determination module 116, in accordance with one or more implementations.

A sixth operation 212 may include billing the user based at least in part on the determining. Sixth operation 212 may be performed by one or more hardware processors configured by machine-readable instructions including a module that is the same as or similar to user billing module 118, in accordance with one or more implementations.

A seventh operation 214 may include updating an inventory level for the at least one autonomous storage unit. The updating may be based in part on one or more of the determining and the billing. Seventh operation 214 may be performed by one or more hardware processors configured by machine-readable instructions including a module that is the same as or similar to inventory level update module 120, in accordance with one or more implementations.

FIG. 2B illustrates method 200-b, in accordance with one or more implementations.

A first operation 216 may include identifying, via an image recognition device, the respective inventory item. The inventory item may be linked to an inventory item pick up event, for example. First operation 216 may be performed by one or more hardware processors configured by machine-readable instructions including a module that is the same as or similar to inventory item identifying module 122, in accordance with one or more implementations.

Figure 2C:
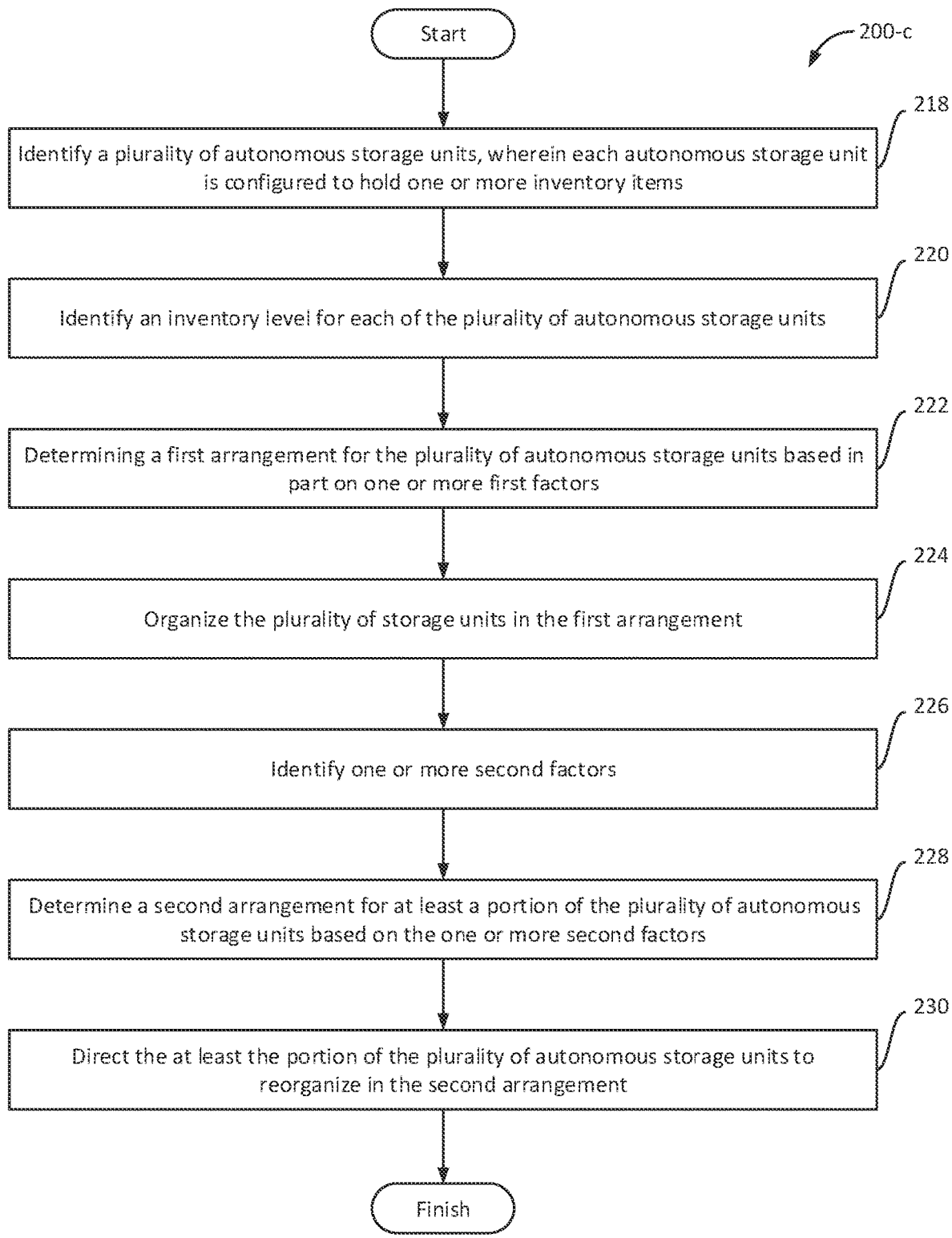
FIG. 2C illustrates a method for dynamically organizing autonomous storage units in a retail control territory, in accordance with one or more implementations.

Turning now to FIG. 2C, which illustrate a methods 200-c for dynamically organizing autonomous storage units in a retail control territory, in accordance with one or more implementations. The autonomous storage units described in relation to FIG. 2C may be or similar or substantially similar to any of the storage units or robots described herein, such as MITU 400 in FIG. 4, storage unit(s) 601 in FIG. 6, storage unit(s) 701 in FIG. 7, etc.

The operations of method 200-c presented below are intended to be illustrative. In some implementations, method 200-c may be accomplished with one or more additional operations not described, and/or without one or more of the operations discussed. Additionally, the order in which the operations of method 200-c are illustrated in FIG. 2C and described below is not intended to be limiting.

In some implementations, method 200-c may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200-c in response to instructions stored electronically on an electronic storage medium. The one or more processing devices may include one or more devices configured through hardware, firmware, and/or software to be specifically designed for execution of one or more of the operations of method 200-c.

FIG. 2C illustrates a method 200-c for dynamically organizing autonomous storage units in a retail control territory, in accordance with one or more implementations.

A first operation 218 may comprise identifying a plurality of autonomous storage units, wherein each autonomous storage unit is configured to hold one or more inventory items. Some non-limiting examples of inventory items include packaged foods; clothing; perishable items, such as fresh produce, milk, meat; and/or medications. Other types of inventory items are contemplated in different embodiments. In other words, the inventory items described in relation to FIG. 2C and in other portions of the disclosure are not intended to be limiting. First operation 218 may be performed by one or more hardware processors configured by machine-readable instructions including a module that is the same as or similar to storage unit identifying module 112, in accordance with one or more implementations.

Second operation 220 may comprise identifying an inventory level for each of the plurality of autonomous storage units, the inventory level comprising at least a number/quantity and product description of one or more inventory items held by each autonomous storage unit. In some cases, the product description may comprise one or more of a barcode, a SKU, a QR code (if applicable), a brand name or product name, a size (e.g., to differentiate between 10 oz potato chips and 20 oz potato chips sold by the same manufacturer), and any other relevant information related to the inventory item. Second operation 220 may be performed by one or more hardware processors configured by machine-readable instructions including a module that is the same as or similar to inventory item identifying module 122, in accordance with one or more implementations. In some cases, the inventory item identifying module 122 may be at least one of logically, electronically, and communicatively coupled to a sensor (e.g., barcode reader, RFID scanner, QR code scanner, weight sensor, image recognition device) of each autonomous storage unit. In some cases, autonomous storage units may utilize one or more sensors to track their inventory and/or detect inventory item pick up events, to name two non-limiting examples, further described in relation to FIGS. 4 and 5.

Third operation 222 may comprise determining a first arrangement for the plurality of autonomous storage units based in part on one or more first factors. The one or more first factors may or may not be related to the inventory levels of the different autonomous storage units. In some cases, the one or more first factors may comprise or be associated with: a time of day (e.g., 6 am-9 am, 4 pm-6 pm, etc.), ad space(s) sold or leased at the retail control territory, where the ad space(s) may be associated with one or more product/inventory item manufacturers, historical buying patterns for one or more users in the retail control territory, historical selling patterns at the retail control territory, and/or information pertaining to inventory items in stock at the retail control territory, to name a few non-limiting examples. In some examples, the information pertaining to the inventory items in stock at the retail control territory may include one or more of inventory levels of the different items in stock at the retail control territory, expiration dates (if applicable), discounts (if applicable), etc. For instance, a grocery store having a large stockpile of yogurt from brand 'A' may wish to sell said yogurt before its expiration date. In such cases, the retail controller at the store may methodically arrange one or more autonomous storage units holding the yogurt from brand 'A' in certain locations at the grocery store to maximize their sales. For instance, from analyzing past selling patterns at the grocery store, the retail controller may determine that customers who tend to buy fresh produce are more likely to buy yogurt, since they are health conscious. In order to maximize sales of the yogurt from brand 'A', the retail controller (or the storage unit arrangement module 114 in FIG. 1) may instruct one or more of the autonomous storage units holding the yogurt to arrange near the fresh produce section (or alternatively, near other autonomous storage units holding fresh produce). In another example, the retail controller may instruct an autonomous storage unit holding said yogurt to arrange near the probiotics section in the medicine aisle, or alternatively, near an autonomous storage unit holding Kombucha. In some cases, this systematic placement of autonomous storage units to drive sales may be based on evaluating numerous factors, such as, but not limited to, prior selling patterns (i.e., at the same or a different retail store).

In some cases, the arrangement of autonomous storage units may depend on the time of day. Specifically, selling patterns at a store may vary widely depending on if it is a weekday or weekend, if it is breakfast/lunch/dinner time, if it is late night, if it is a holiday (e.g., Thanksgiving, Easter, etc.), to name a few non-limiting examples. For instance, a retail controller may instruct autonomous storage units holding quick grab and go items (e.g., breakfast burritos, protein shakes, granola bars, etc.) to arrange in a smaller area (e.g., near the entrance) when it is breakfast time on a weekday, which may not only enhance sales, but also customer experience. Contrastingly, when it is late at night (e.g., past 11 pm), a retail controller may instruct autonomous storage units holding snacks and other junk food to assemble near autonomous storage units holding beer/wine/soft drinks, etc., and towards a far end of the store, based on determining that late night shoppers tend to have more time, are willing to walk around the store until they find beer/snacks, and are more likely to purchase additional items that are not on their shopping list. In this way, the store may maximize their late night sales by arranging autonomous storage units in a particular way so that customers are presented with items (e.g., frozen pizza, paper plates, disposable cups, etc.) that are appealing to them at that hour. Third operation 222 may be performed by one or more hardware processors configured by machine-readable instructions including a module that is the same as or similar to factor determination module 134, likelihood estimating module 110, event determination module 116, inventory level update module 120, inventory item identifying module 122, user identity identifying module 108, and/or ad space module 130, in accordance with one or more implementations.

Fourth operation 224 may comprise organizing the plurality of storage units in the first arrangement. Fourth operation 224 may be performed by one or more hardware processors configured by machine-readable instructions including a module that is the same as or similar to storage unit arrangement module 114, in accordance with one or more implementations.

Fifth operation 226 may comprise identifying one or more second factors. The one or more second factors may be similar or substantially similar to the one or more first factors, and may include a time of day (e.g., 6 am-9 am, 4 pm-6 pm, etc.), ad space(s) sold or leased at the retail control territory, historical buying patterns for one or more users in the retail control territory, historical selling patterns at the retail control territory, and/or information pertaining to inventory items in stock at the retail control territory, to name a few non-limiting examples. Additionally or alternatively, the one or more second factors may comprise one or more performance results associated with the first arrangement, where the one or more performance results may comprise a revenue, profits, quantity of inventory items sold, number of customers served, etc. In some embodiments, the retail controller or autonomous storage units may test out different arrangements (e.g., length of aisle, area of store in which autonomous storage units holding certain inventory items are arranged) and compare performance results of the same to determine an optimal arrangement for the retail store. In some cases, the optimal arrangement of autonomous storage units may also vary by time of day, day of week, season, etc. Further, retail controllers and/or autonomous storage units associated with different retail stores (or retail control territories) may also share information pertaining to the different arrangements that have been tested, as well as their corresponding performance results. For instance, a retail controller in territory 'A' may receive an indication from a controller in territory 'B' that a particular arrangement of storage units optimizes sales. The retail controller in territory 'A' may then test out that arrangement and share its performance results with one or more other controllers. In some cases, an arrangement that enhances sales or profits in one retail store (e.g., in a small to mid-size city) may not necessarily be optimal in another retail store (e.g., in a large city). Hence, by testing different variations and sharing information related to the same, retail controllers may determine what factors drive sales in their own control territory. Fifth operation 226 may be performed by one or more hardware processors configured by machine-readable instructions including a module that is the same as or similar to factor determination module 134, user identity identifying module 108, likelihood estimating module 110, event determination module 116, inventory level update module 120, inventory item identifying module 122, and/or ad space module 130, in accordance with one or more implementations.

Sixth operation 228 may comprise determining a second arrangement for at least a portion of the plurality of autonomous storage units based on the one or more second factors. In addition to the second factors described above, in some cases, the one or more second factors may be associated with at least one event, such as a user entering the retail store (or retail control territory), an inventory item pick up event, wherein the inventory item pick up event comprises removal of an inventory item from one of the plurality of autonomous storage units, detecting that an inventory level for at least one autonomous storage unit is below a threshold, receiving one or more messages from a central server (i.e., retail controller), or a combination thereof. In some embodiments, determining an inventory pick up event comprises identifying, via a built-in weighing scale, a weight change at the one of the plurality of autonomous storage units, wherein determining the inventory item pick up event further comprises correlating the weight change to an inventory item in an inventory item database. Other methods of determining an inventory pick up event are contemplated in different embodiments, for instance, using a barcode reader, a camera or image recognition device, a RFID reader, etc. Sixth operation 228 may be performed by one or more hardware processors configured by machine-readable instructions including a module that is the same as or similar to factor determination module 134, user identity identifying module 108, likelihood estimating module 110, event determination module 116, inventory level update module 120, inventory item identifying module 122, and/or ad space module 130, in accordance with one or more implementations.

Seventh operation 230 may comprise directing the at least the portion of the plurality of autonomous storage units to organize in the second arrangement. Seventh operation 230 may be performed by one or more hardware processors configured by machine-readable instructions including a module that is the same as or similar to storage unit arrangement module 114, in accordance with one or more implementations.

As described below in relation to FIGS. 8 and 9, in some cases, determining one or more of the first arrangement and the second arrangement may be further based on identifying one or more ad spaces sold or leased in the retail control territory. For instance, a manufacturer may lease an end-cap aisle ad space to promote their products, increase sales, etc. In such cases, an autonomous storage unit holding inventory items for that manufacturer may be positioned such that it is located at an end-cap of an aisle, where the aisle may be formed using regular shelves (e.g., immovable shelves), or alternatively by a plurality of autonomous storage units.

Figure 3:
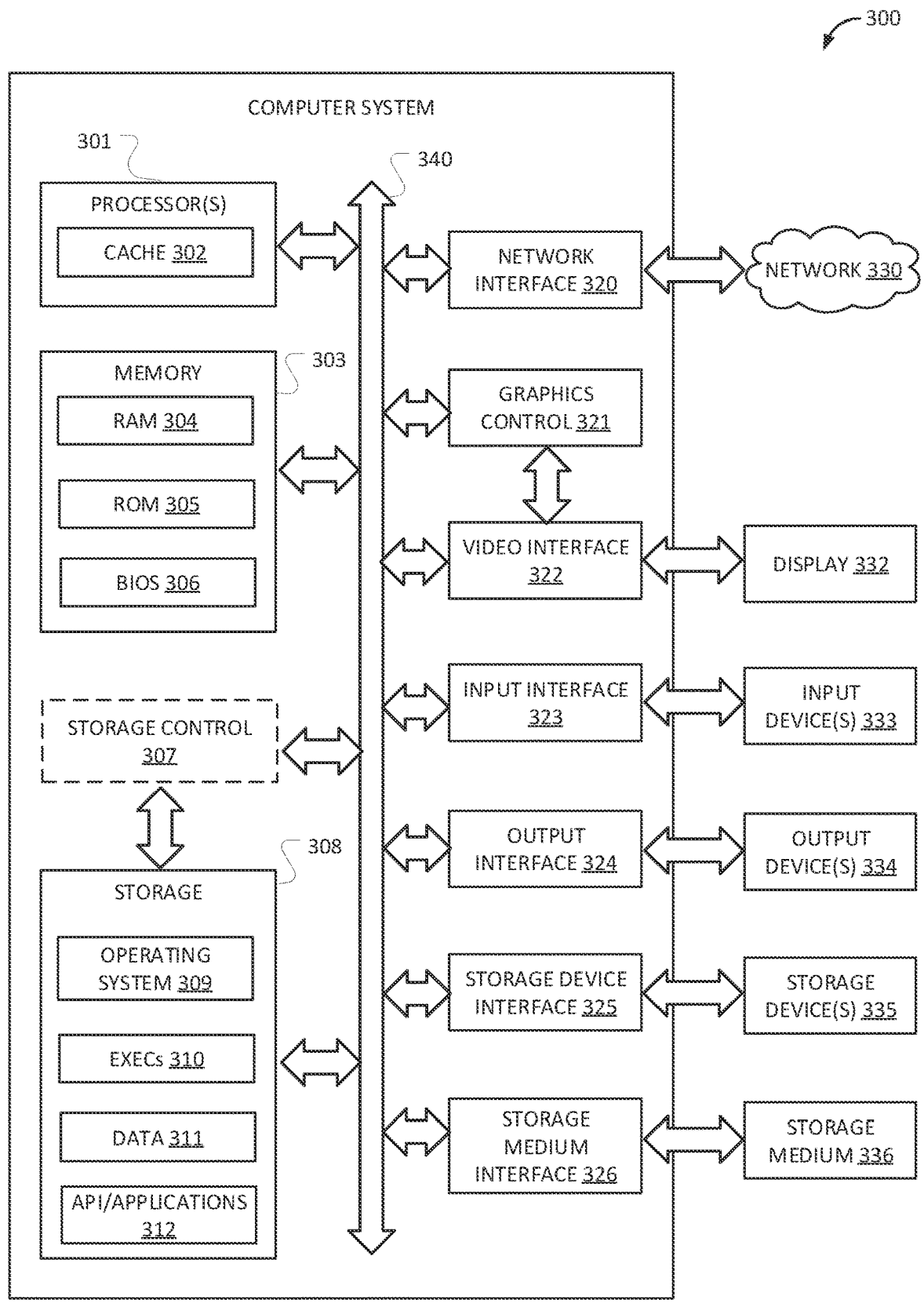
FIG. 3 is a block diagram depicting an exemplary machine that includes a computer system within which a set of instructions can be executed for causing a device to perform or execute any one or more of the aspects and/or methodologies of the present disclosure.

Referring to FIG. 3, it is a block diagram depicting an exemplary machine that includes a computer system 300 within which a set of instructions can execute for causing a device to perform or execute any one or more of the aspects and/or methodologies of the present disclosure. The components in FIG. 3 are examples only and do not limit the scope of use or functionality of any hardware, software, embedded logic component, or a combination of two or more such components implementing particular embodiments.

Computer system 300 may include a processor 301, a memory 303, and a storage 308 that communicate with each other, and with other components, via a bus 340. The bus 340 may also link a display 332, one or more input devices 333 (which may, for example, include a keypad, a keyboard, a mouse, a stylus, etc.), one or more output devices 334, one or more storage devices 335, and various tangible storage media 336. All of these elements may interface directly or via one or more interfaces or adaptors to the bus 340. For instance, the various tangible storage media 336 can interface with the bus 340 via storage medium interface 326. Computer system 300 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 301 (or central processing unit(s) (CPU(s))) optionally contains a cache memory unit 302 for temporary local storage of instructions, data, or computer addresses. Processor(s) 301 are configured to assist in execution of computer readable instructions. Computer system 300 may provide functionality for the components depicted in FIGS. 1 and 2A-C as a result of the processor(s) 301 executing non-transitory, processor-executable instructions embodied in one or more tangible computer-readable storage media, such as memory 303, storage 308, storage devices 335, and/or storage medium 336. The computer-readable media may store software that implements particular embodiments, and processor(s) 301 may execute the software. Memory 303 may read the software from one or more other computer-readable media (such as mass storage device(s) 335, 336) or from one or more other sources through a suitable interface, such as network interface 320. The software may cause processor(s) 301 to carry out one or more processes or one or more steps of one or more processes described or illustrated herein. Carrying out such processes or steps may include defining data structures stored in memory 303 and modifying the data structures as directed by the software.

The memory 303 may include various components (e.g., machine readable media) including, but not limited to, a random-access memory component (e.g., RAM 304) (e.g., a static RAM "SRAM", a dynamic RAM "DRAM, etc.), a read-only component (e.g., ROM 305), and any combinations thereof. ROM 305 may act to communicate data and instructions unidirectionally to processor(s) 301, and RAM 304 may act to communicate data and instructions bidirectionally with processor(s) 301. ROM 305 and RAM 304 may include any suitable tangible computer-readable media described below. In one example, a basic input/output system 306 (BIOS), including basic routines that help to transfer information between elements within computer system 300, such as during start-up, may be stored in the memory 303.

Fixed storage 308 is connected bidirectionally to processor(s) 301, optionally through storage control unit 307. Fixed storage 308 provides additional data storage capacity and may also include any suitable tangible computer-readable media described herein. Storage 308 may be used to store operating system 309, EXECs 310 (executables), data 311, API applications 312 (application programs), and the like. Often, although not always, storage 308 is a secondary storage medium (such as a hard disk) that is slower than primary storage (e.g., memory 303). Storage 308 can also include an optical disk drive, a solid-state memory device (e.g., flash-based systems), or a combination of any of the above. Information in storage 308 may, in appropriate cases, be incorporated as virtual memory in memory 303.

In one example, storage device(s) 335 may be removably interfaced with computer system 300 (e.g., via an external port connector (not shown)) via a storage device interface 325. Particularly, storage device(s) 335 and an associated machine-readable medium may provide nonvolatile and/or volatile storage of machine-readable instructions, data structures, program modules, and/or other data for the computer system 300. In one example, software may reside, completely or partially, within a machine-readable medium on storage device(s) 335. In another example, software may reside, completely or partially, within processor(s) 301.

Bus 340 connects a wide variety of subsystems. Herein, reference to a bus may encompass one or more digital signal lines serving a common function, where appropriate. Bus 340 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 300 may also include an input device 333. In one example, a user of computer system 300 may enter commands and/or other information into computer system 300 via input device(s) 333. Examples of an input device(s) 333 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 333 may be interfaced to bus 340 via any of a variety of input interfaces 323 (e.g., input interface 323) including, but not limited to, serial, parallel, game port, USB, FIREWIRE, THUNDERBOLT, or any combination of the above.

In particular embodiments, when computer system 300 is connected to network 330, computer system 300 may communicate with other devices, specifically mobile devices and enterprise systems, connected to network 330. Communications to and from computer system 300 may be sent through network interface 320. For example, network interface 320 may receive incoming communications (such as requests or responses from other devices) in the form of one or more packets (such as Internet Protocol (IP) packets) from network 330, and computer system 300 may store the incoming communications in memory 303 for processing. Computer system 300 may similarly store outgoing communications (such as requests or responses to other devices) in the form of one or more packets in memory 303 and communicated to network 330 from network interface 320. Processor(s) 301 may access these communication packets stored in memory 303 for processing.

Examples of the network interface 320 include, but are not limited to, a network interface card, a modem, and any combination thereof. Examples of a network 330 or network segment 330 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 330, may employ a wired and/or a wireless mode of communication. In general, any network topology may be used.

Information and data can be displayed through a display 332. Examples of a display 332 include, but are not limited to, a liquid crystal display (LCD), an organic liquid crystal display (OLED), a cathode ray tube (CRT), a plasma display, and any combinations thereof. The display 332 can interface to the processor(s) 301, memory 303, and fixed storage 308, as well as other devices, such as input device(s) 333, via the bus 340. The display 332 is linked to the bus 340 via a video interface 322, and transport of data between the display 332 and the bus 340 can be controlled via the graphics control 321.

In addition to a display 332, computer system 300 may include one or more other peripheral output devices 334 including, but not limited to, an audio speaker, a printer, and any combinations thereof. Such peripheral output devices may be connected to the bus 340 via an output interface 324. Examples of an output interface 324 include, but are not limited to, a serial port, a parallel connection, a USB port, a FIREWIRE port, a THUNDERBOLT port, and any combinations thereof.

In addition, or as an alternative, computer system 300 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

FIG. 4 illustrates an example of an autonomous robot, also referred to as Mobile Inventory Transport Unit (MITU) 400, according to an embodiment of the disclosure. In some cases, MITU 400 may also be referred to as a smart rack robot, an autonomous smart rack robot, or an autonomous inventory storage unit. In some cases, MITU 400 may comprise a robot portion, where the robot portion may include one or more of drive device 401, balance device 402, control device 410, navigation device 420, sensing device 430, and power device 440. Further, the MITU 400 may comprise a structural portion including at least housing 405 and inventory storage device 450. In some examples, the robot portion of the MITU 400 may be shaped like a cube, a cuboid, a cylinder, or any other shape, and may comprise one or more wheels and balance devices on its lower portion. In some other cases, the robot portion may be surrounded by, or substantially surrounded by the housing 405. Further, the robot portion may be in electronic communication (either wired or wireless) with the housing 405 and/or the inventory storage device 450.

In some examples, housing 405 encloses the electrical and physical components contained within MITU 400. Housing 405 is physically coupled to an inventory storage device and serves as the base for the inventory storage device. Importantly, the physical coupling conjoins the inventory storage device and the housing 405 such that the two devices function as one physical object. In some cases, the housing 405 and the inventory storage device may be joined via screws, nuts and bolts, nails, any other type of fastener. Alternatively, the housing 405 and the inventory storage device 450 may be welded together or formed as a single unitary construction.

Inventory Storage

MITU 400 includes inventory storage device 450. Inventory storage device 450 stores physical items, such as inventory, that MITU 400 moves from at least a first physical location to a second physical location, or even multiple locations. Inventory storage device 450 may be a variety of storage devices including shelves, buckets, augers, and arms. Additionally or alternatively, the inventory storage device 450 may also comprise climate controlled units for handling and transporting items (e.g., pharmaceuticals, vaccines, blood for blood banks or blood donation drives, perishable goods, beverages, etc.) that need to be kept at a certain goal temperature. As shown, inventory storage device may be physically coupled to housing 405. In other words, the physical coupling of housing 405 and inventory storage device 450 creates one physical object. As shown, in some examples, the housing 405 and inventory storage device 450 may be in the form of a cube or a cuboid, and may be joined together via welding, or using one or more fasteners. In some other cases, a rod or pole (not shown) may pass through the center of the housing 405, where the rod is affixed to the upper portion of the housing 405. Further, the inventory storage device 450 may be installed on or around the rod, such that the rod passes through one or more shelves of the inventory storage device (i.e., shelves are perpendicular to the rod).

As indicated above, the inventory storage device 450 coupled with the robot portion of the MITU 400 may collectively be referred to as a smart rack robot. In some instances, upon loading, the inventory storage device may be operationally configured to determine information pertaining to the inventory it is holding. For instance, the smart rack robot may determine one or more of a name, a description, a quantity, a bar code or stock keeping unit (SKU), a price, a weight, a dimension, and a location within the inventory storage device for one or more items held by the storage device.

In some embodiments, the inventory storage device 450 may receive power from power device 440 of the robot portion of the MITU 400, for instance, to power lights or a display mounted on the inventory storage device. Additionally, or alternatively, the inventory storage device 450 may also comprise a power source (not shown), which may be used as a backup for power device 440. In some cases, the power may be transferred via cabling running through the center of the robot portion and the housing 405. For instance, one or more power cables may be installed around or inside the center rod (or pole) of the MITU 400. In one example, the robot portion of the MITU 400 may be configured to rotate inside the housing 405, for instance, when MITU 400 is turning at a corner. In such cases, a slip ring may be used to supply power and data to from the power device 440 to the inventory storage device 450. Slip rings may be examples of electromechanical devices that allow the transmission of power and electrical signals from a rotating object (e.g., robot portion) to a stationary structure (e.g., inventory storage device).

In some other cases, the power may be transferred wirelessly (e.g., resonant inductive coupling) or via an NFC connection. For instance, the housing 405 and the inventory storage device 450 may comprise NFC antennas that are coupled and spaced a distance (e.g., 1 mm, 2 mm, 1 cm, 2 cm, etc.) apart, allowing bidirectional transfer of power and data. The NFC antennas may be microstrip patch antennas (e.g., square, rectangle, circular, elliptical, or any other continuous shape) fabricated on the surface of a printed circuit board (PCB). Further, the substrate of the PCB may be composed of a dielectric material, such as Gallium Nitride (GaN), Gallium Arsenide (GaAs), epoxy resin, Teflon, ceramic, etc. In some cases, the MITU 400 may receive wireless power during transit on a transport system. For example, a resonant inductive loop/coil on the MITU 400 may inductively couple with another resonant inductive loop/coil on the transport system, which may enable the MITU 400 to remain charged during transit. Alternatively, the MITU 400 may be configured to dock with a charging station (e.g., power outlet) on the transport system. It should be noted that the MITU 400 may comprise both wired and wireless charging capabilities in some embodiments.

In some embodiments, the inventory storage device 450 may comprise one or more visual indicators, such as one or more rows of lights 411 (e.g., Light Emitting Diode (LED) lights). Further, the robot portion or the inventory storage device 450 may be configured to illuminate one or more lights or an entire row of lights, for instance, while a user is loading or unloading the shelves of the inventory storage device. In some cases, such lighting may be used to indicate which shelf or section of the inventory storage device a user is meant to pick an item from, which may not only serve to accelerate the loading and unloading process, but also improve user accuracy.

In some examples, the visual indicator may comprise a display 460, where the display 460 may be mounted on the inventory storage device 450. The display 460 may be an example of a Liquid Crystal Display (LCD), a LED display, or another High Definition (HD) display. In some cases, MITU 400 may deployed in a retail setting, and the display 460 may be used to display a price, or other key product information such as product specification, nutrition information and/or ingredients (if applicable), or even a product image. In some examples, the inventory storage device 450 may comprise one or more buttons adjacent (e.g., above or below) a slot or shelf on which a product is placed, and a user may view product information on the attached display by clicking the said buttons. In some embodiments, the inventory storage device may also comprise one or more cameras, Radio Frequency Identification (RFID) readers, or weigh scales for tracking inventory. In one example, a camera mounted on the inventory storage device 450 may capture images or video feeds, based on which the MITU may determine information pertaining to an item (e.g., description, quantity, etc.) that was taken off a shelf. In other cases, a RFID reader may scan RFID tags attached to items or products remaining on the shelf in order to determine the items (e.g., description, quantity, etc.) that were taken off the shelf. In yet other cases, a built-in weighing scale may be used to correlate the weight of the removed items to the weights and locations of different items initially stored in the inventory storage device 450. It should be noted that the inventory storage device may incorporate one or more of the inventory tracking techniques described above.

Upon detecting the removal of one or more items from its shelves, the inventory storage device 450 may update its inventory level and relay that information to a retail store based system or to the manufacturer (e.g., if the retailer utilizes pull-based replenishment methods). In other cases, the inventory storage device may alert or advise the retail store, for instance, if a customer incorrectly placed an item on its shelves. In yet other cases, the inventory storage device may issue alerts when it determines that it is being loaded or unloaded at a time outside a scheduled or authorized time period. In some cases, the inventory storage device may flash blinking lights or sound an audible alarm in response to such events.

Drive

In some embodiments, the MITU is configured to account for various anomalies in the environment, such as raised surfaces or other varying terrain. MITU 400 includes drive device 401. Drive device 401 supplies the method of moving MITU 400. Drive device 401 may be a variety of locomotion devices including one or more wheels, treads, or actuators. In some cases, drive device 401 may comprise four wheels, one on each edge or side of MITU 400. In some cases, one or more wheels may be raised up while the MITU 400 is traveling in a straight line. In some other cases, all four wheels may be in contact with the ground, for instance, to turn the MITU 400. In some embodiments, drive device 401 and control device 410 may control the pace at which the wheels rotate (i.e., same or different pace), allowing the MITU 400 to turn or take corners. In some examples, the MITU 400 may receive terrain information while navigating through a particular area from one or more other MITUs that have previously navigated through the same area, or alternatively, from a control system of a mobile inventory transport communication network. In other cases, the MITU 400 may identify variations in terrain in real-time, for example, via one or more sensors. The sensors may be selected from a group consisting of an accelerometer, a gyroscope, or any other sensors configured to register rapid variations in movement or spring displacement, which may indicate the presence of rough terrain. In other cases, the MITU 400 may support an "off-road" mode, which may include one or more of changing its suspension profile, spring dampening effects, and ground clearance.

In some examples, MITU 400 may be bipedal (2 legs), quadrupedal (4 legs), or hexapedal (6 legs). In some other examples, MITU 400 may comprise a combination of wheels and legs and may be referred to as a hybrid transport unit. In yet other examples, drive device 401 may enable MITU 400 to navigate by slithering (i.e., in a snake like motion). In some aspects, drive device 401 is the primary method for physically moving MITU 400 from a start point to an end point.

Balance

In some cases, MITU 400 may include balance device 402. In some cases, balance device 402 may supply weight distribution of MITU 400 and may offset the force exerted by drive device 401 when MITU 400 is either stationary or moving. In some examples, balance device 402 may incorporate a variety of balance devices including one or more wheels, one or more bearings, or a fixed apparatus. For instance, balance device 402 may be composed of two wheels, one in the front and one in the rear of the MITU 400. In some other cases, balance device 402 may comprise one or more sensors, such as a gyroscope, an accelerometer, or a combination. A gyroscope may be an example of a device used for measuring or maintaining orientation and/or angular velocity, and the orientation of the MITU 400 may be adjusted based in part on the output readings from the gyroscope. In some examples, a gyroscope or an accelerometer may be used in combination with a controller (e.g., a proportional-integral-derivative (PID) controller) to balance the MITU 400. In one example, MITU 400 or a control device 410 of MITU 400 may gather readings from one or more sensors (e.g., accelerometer or gyroscope) installed within the MITU. Further, MITU 400 may calculate an altitude (i.e., angle with respect to the horizon, or a surface the MITU is traveling over), compare the angle with a target angle (e.g., 0 degrees if it's a flat surface, 15 degrees, 30 degrees, etc., if it's an incline), and calculate a difference between the two angles. Based on the difference between the angles, the drive device 401 may cause the MITU 400 to accelerate (or decelerate) until the difference between the angles is reduced to zero to preserve the balance.

Navigation, Sensing & Control

In some cases, the housing 405 may comprise one or more slots or openings for a sensor or sensing device 430. Further, the sensing device 430 (e.g., camera, or object detection device) may be installed such that it is aligned or substantially aligned with the one or more slots or openings. In some examples, there may be a slot or opening on each side or edge of the housing, allowing a 360-degree field of view at the MITU 400. In some embodiments, one or more edges of the housing 405 (e.g., front edge) may comprise an additional opening behind which one or more other sensors (e.g., a LIDAR sensor) may be installed.

MITU 400 includes control device 410. Control device 410 locally controls the autonomous movement of MITU 400 in response to multiple inputs. Control device 410 includes a control unit which incorporates software and hardware into autonomous control of MITU 400. Control device 410 may be in communication with multiple other systems including one or more central systems (e.g., warehouse system, retail system), transportation systems (e.g., vehicles or transportation providers utilized to relocate the MITU from one geographic site to another), or even other MITUs or smart rack robots, to control the movement of MITU 400 in response to these systems' requirements. In some cases, such communication may be facilitated via Wi-Fi, Bluetooth, Near Field Communication (NFC), Cellular, Radio, or any other means.

Control device 410 is also in communication with sensing device 430 and responds to physical objects detected by the sensing device 430, for instance. Control device 410 is also in communication with drive device 401 to control the movement of MITU 400. In some cases, control device 410 may include an analog to digital (ADC) converter to convert analog readings (or signals) from the various sensors into digital signals and may also incorporate a feedback loop. As an example, MITU 400 may be configured to travel in a straight-line while being surrounded on both sides by other objects (e.g., robots, shelves, etc.), a typical scenario inside a warehouse. Further, the control device 410 may receive information pertaining to the objects from the sensing device 430. In some cases, the sensing device 430 may comprise one or more infrared object detectors that can measure the distance from the left and right sides of the MITU 400 to the objects. The sensing device 430 may create a continuous analog voltage that depends inversely on the distance to the objects. In some cases, the analog voltage may be passed on to the ADC converter in the control device 410, following which the control device 410 computes an error (e.g., a difference between readings from the left and right sides of the robot), and adjusts the inputs to the drive device 401 until the error is reduced to zero.

MITU 400 includes navigation device 420, wherein the navigation device 420 determines the physical position of MITU 400 and communicates the location data to the control device 410. Navigation device 420 may incorporate a variety of methods of location identification including one or more of Global Positioning System (GPS), 802.11 Wi-Fi, Cellular, Quick Response (QR) codes, barcodes, Radio-Frequency Identification (RFID), Near Field Communication (NFC), magnetic positioning, Ultra-wide band (UWB), ultrasound, etc. While GPS and cellular methods of location identification suffice for outdoor applications, they lack accuracy and reliability indoors, especially in large multi-story buildings (e.g., warehouses, hotels, office buildings), airports, parking garages, and underground locations. In such cases, alternate techniques and devices may be utilized to provide indoor position, which may range from Wi-Fi and Bluetooth antennas to purpose-built installations with relays and beacons.

In some other cases, QR codes or barcodes may be affixed to known locations inside the warehouse or indoor structure navigated by the MITU 400. For instance, a MITU 400 navigating within a warehouse or building may be able to determine its location based on scanning and decoding the QR codes. In some cases, the MITU 400 may be aware of the QR code associated with an end point within the warehouse. In such cases, the MITU may navigate (e.g., in straight lines between QR codes), until the end point is reached. In one example, localization of the MITU 400 may be determined from odometry readings gathered from the drive device 401. For instance, the control device 410 or the drive device 401 may maintain an accurate count of the number of times the drive device 401 or a motor turning the wheels has turned. Further, since the diameter of the wheel and the starting point is known, the localization of the MITU 400 may be determined by calculating straight line distances between two adjacent points. As an example, if MITU 400 is navigating between a starting point A and an ending point F, via intermediate points B, C, D, and E, the control device 410 or drive device 401 may compute the number of times the drive device 401 needs to turn in order to ensure MITU 400 reaches point B, recalculates the number of times the drive device 401 needs to turn to reach point C (i.e., once point B is reached), and so on. In some cases, the MITU 400 may determine it has reached an intermediate point based on scanning a QR code at that point. In some examples, the QR codes may be affixed to the floor, on the ceiling, or another known location. Further, the QR codes may be visible (e.g., printer ink) or invisible (e.g., UV ink, infrared ink, etc.) to the naked human eye. In some cases, a camera, or QR code or barcode reader on the MITU 400 may be configured to scan and identify codes painted in ink invisible to the human eye. Additionally, or alternatively, the MITU 400 may comprise one or more infrared LEDs for illuminating targets, which can then be identified by the camera or QR code reader. It should be noted that this camera or barcode reader may be the same as, or in addition to the camera and barcode reader utilized by the inventory storage device 450, described above.

MITU 400 includes sensing device 430. Sensing device 430 responds to physical object(s) in the vicinity of MITU 400. Sensing device 430 may incorporate a variety of sensing methods, such as, but not limited to, visual or infrared cameras, LIDAR, Radar, Laser, and/or ultrasound (or ultrasonic). Sensing device 430 communicates the physical object data to control device 410. Single or multiple camera configurations may be incorporated in order to provide stereo camera implementations, for instance, to obtain depth information. In some cases, the sensing device 430 may generate a 3D virtual rendition of the warehouse or building to assist MITU 400 during navigation. In some circumstances, the MITU 400 may combine the 3D virtual model of its navigating environment with real data, such as, but not limited to, physical building measurements, real-time acquired robot's position (i.e., based on rotation of wheels, QR codes, etc.), and data acquired from scanning (e.g., laser, LIDAR, radar, etc.) to further enhance and visualize object detection for navigation. In some other cases, the sensing device 430 may deploy a technology, referred to as Simultaneous Location and Mapping (SLAM), where data from multiple sensors may be fused together to enable the MITU 400 to locate itself in a predetermined map without the use of fixed markers (e.g., QR codes, beacons, RFID tags, etc.).

Power

MITU 400 includes power device 440, wherein power device 440 supplies power to various components of MITU 400. Power device 440 may be in electrical communication with one or more of the drive device 401, control device 410, navigation device 420, sensing device 430, and inventory storage device 450. In some cases, power device 440 may be a battery, a fuel cell, and/or a solar cell, to name a few non-limiting examples. In other embodiments, inductive charging or magnetic resonance charging (i.e., wireless power transfer) may be utilized, which may allow the robot or MITU 400 to charge while moving, such as when the robot is moving up and down aisleways, or when MITU 400 is loaded on the transport vehicle. In such cases, the MITU 400 may not need to dock to a charge station. In some cases, inductive charging plates may be installed in transport vehicles, warehouses, retail stores, etc., that the MITU 400 may park on for wireless transfer of power. Additionally or alternatively, the MITU 400 may be configured to receive power from one or more recharge or power outlets installed on the transportation system. In some examples, a transportation system, such as a truck, may comprise a plurality of power outlets (or charging ports) for charging one or more MITUs. In some cases, the battery of the MITU 400 may be removable. In such cases, the MITU 400 or a human operator may replace the drained battery with a charged one.

In some embodiments, MITUs or autonomous smart rack robots may behave not just as individual devices, but like a swarm of devices. For instance, the power device 440 of MITU 400 may be operationally configured to request power from or relay power to another MITU in its vicinity. In some examples, such power transfer may be achieved via power connectors, such as male/female connectors or magnetically attachable power connectors located on the MITUs. In some other cases, the MITU 400 may request to use a power supply/outlet when it is running low on power, for instance, when another autonomous storage unit is already using the said power supply and has reached a sufficient level of charge. In some cases, a swarm of MITUs may be configured to tightly pack themselves, which serves to not only reduce floor space, but also the number of charge points needed. In some circumstances, floor mounted recharge plates may be installed on warehouse floors or on the floor of the transportation system to propagate power to a large number of tightly packed MITUs.

In yet other cases, the power device 440 may comprise one or more solar panels coupled to a battery source, which may allow the MITU 400 to operate in an environment with limited charging facilities. For instance, in some examples, the MITU 400 may be deployed as a vending machine in a public space, such as a town square, a sporting event, a street with heavy foot traffic, etc. Further, by equipping the MITU 400 with renewable energy harnessing capabilities, the MITU 400 may operate for longer durations without needing to be recharged. In some examples, a transportation system may drop off one or more MITUs 400 loaded with inventory at a public location. The MITUs 400 may serve as portable vending machines and may be configured to track their inventory, accept payments (e.g., credit card payments, NFC payments, cryptocurrencies, etc.), and communicate with other MITUs and/or transportation systems. In some cases, the transportation system may pick up one or more of the MITUs, for instance, when their inventory is depleted or power level is under a threshold, or after a pre-defined time. In one non-limiting example, a MITU may be dropped off along a street and instructed to sell all its inventory or until its power level falls under a threshold (e.g., 20% charge), whichever is earlier. In such cases, the MITU may attempt to sell its inventory in the pre-defined area and signal to a transportation system once the objectives have been met, or its power level falls below the threshold. The transportation system may then collect the MITU at or near the original drop off location on the street, or another location pre-negotiated with the MITU. After boarding the transportation system, the MITU may recharge (e.g., via a charging port, battery swap) and resume its mission. Alternatively, if the MITU has sold all its inventory, the MITU may be transported back to a warehouse/distribution center where it may be loaded with additional inventory. In yet other cases, the MITU may be configured to transfer its remaining inventory to a charged MITU on the transport system. The charged MITU may then disembark from the transport system and resume the mission, for instance.

FIG. 5 illustrates a side view of a MITU 500, in accordance with an alternate embodiment of the disclosure. In some cases, MITU 500 may be similar to or substantially similar to MITU 400, as described with reference to FIG. 4. Further, MITU 500 may include one or more of its sub-components. For instance, MITU 500 may comprise a robot portion, including at least a drive device, a balance device, a control device, a navigation device, a sensing device, and a power device. Further, the MITU 500 may comprise a structural portion including at least housing 505 and inventory storage device 550. As shown, in some examples, the robot portion of the MITU 500 may be shaped like a cube, a cuboid, a cylinder, or any other shape, and may comprise one or more wheels and balance devices on its lower portion. In some other cases, the robot portion may be surrounded by, or substantially surrounded by the housing 505. Further, the robot portion may be in electronic communication (either wired or wireless) with the housing device 505 and/or the inventory storage device 550. In some cases, inventory storage device 550 may also comprise one or more lights 511, where the lights 511 may be LEDs.

In some examples, the housing 505 may comprise one or more slots 507 on one or more sides/faces behind which a sensing device may be placed. In some cases, housing 505 may also comprise one or more manual interfaces 510. Further, the manual interface 510 may be a manual power switch through which a user can turn the autonomous storage unit or MITU on/off. In some other cases, the manual interface 510 may comprise one or more connectors (i.e., metallic, conductive, or magnetic), which may be used to dock the MITU to a power outlet or an external charging station, for instance, in a warehouse, transport system, maintenance center, etc. In some examples, the MITU 500 may be configured to navigate autonomously to a charging station when its battery or power level falls below a threshold (e.g., 10%, 20%, etc.). In other cases, the MITU 500 may swap its battery for a charged one. In some cases, the MITU 500 may be configured to swap its battery autonomously. Alternatively, a human operator may be needed to perform the battery swap. As noted above, the MITU 500 may comprise solar panels or other means of harnessing renewable energy, which may enable the MITU 500 to operate in environments with limited charging capabilities.

As shown, in some embodiments, the housing portion of MITU 500 may comprise one or more detachable climate-controlled units 515-*a*, 515-*b* that can slide in and out of the MITU. In some examples, these climate-controlled units 515 may be electrically connected to the power device and may be capable of both heating and cooling. In other cases, the inventory storage device 550 of MITU 500 may also be climate controlled. In such cases, the MITU 500 may be capable of transporting hot and cold items (e.g., food, beverages, medicines or vaccines, etc.).

In one example, upon loading the climate-controlled units 515, the MITU 500 may be specified a certain goal temperature (or temperature range) for those items. In some embodiments, climate-controlled units 515 may comprise one or more electronic temperature sensors (not shown) for real-time monitoring. In such cases, the climate-controlled units or the control device of the autonomous storage unit may adjust the internal temperature to stay within the specified range based in part on readings obtained from the electronic temperature sensors. In some embodiments, climate-controlled units 515-*a* and 515-*b* may be specified different goal temperatures (e.g., one unit may be used for cooling, and the other for heating). In such cases, the MITU or autonomous storage unit may leverage its inbuilt power and control functionality to maintain the units at their respective desired goal temperatures. In yet other cases, the MITU 500 may not be specified a goal temperature for items placed in the climate-controlled units 515 and may identify an appropriate temperature based on determining information pertaining to the one or more loaded items (e.g., via SKUs, RFID tags, barcodes, etc. of the items). In some cases, MITU 500 may be configured to communicate any deviations in temperature outside the specified range to a central system or controller. Upon receiving an alert from the autonomous storage unit or MITU 500, corrective actions may be implemented by one or more of the MITU 500 or the central system. For example, the MITU 500 may receive instructions from the central system to raise or reduce the specified temperature ranges based on the central system determining faulty temperature sensor readings. In other cases, the MITU 500 may be redirected to the closest storage facility or warehouse for a diagnosis check, optionally offload its inventory to a functioning autonomous storage unit, and/or evaluate the condition of its inventory. In this way, the corrective action may be implemented at the MITU 500 in a timely manner, which may also serve to minimize financial losses. In some embodiments, after offloading its inventory to the functioning autonomous storage unit, the MITU 500 may also provide it with instructions on completing the remainder of the mission.

Figure 6:
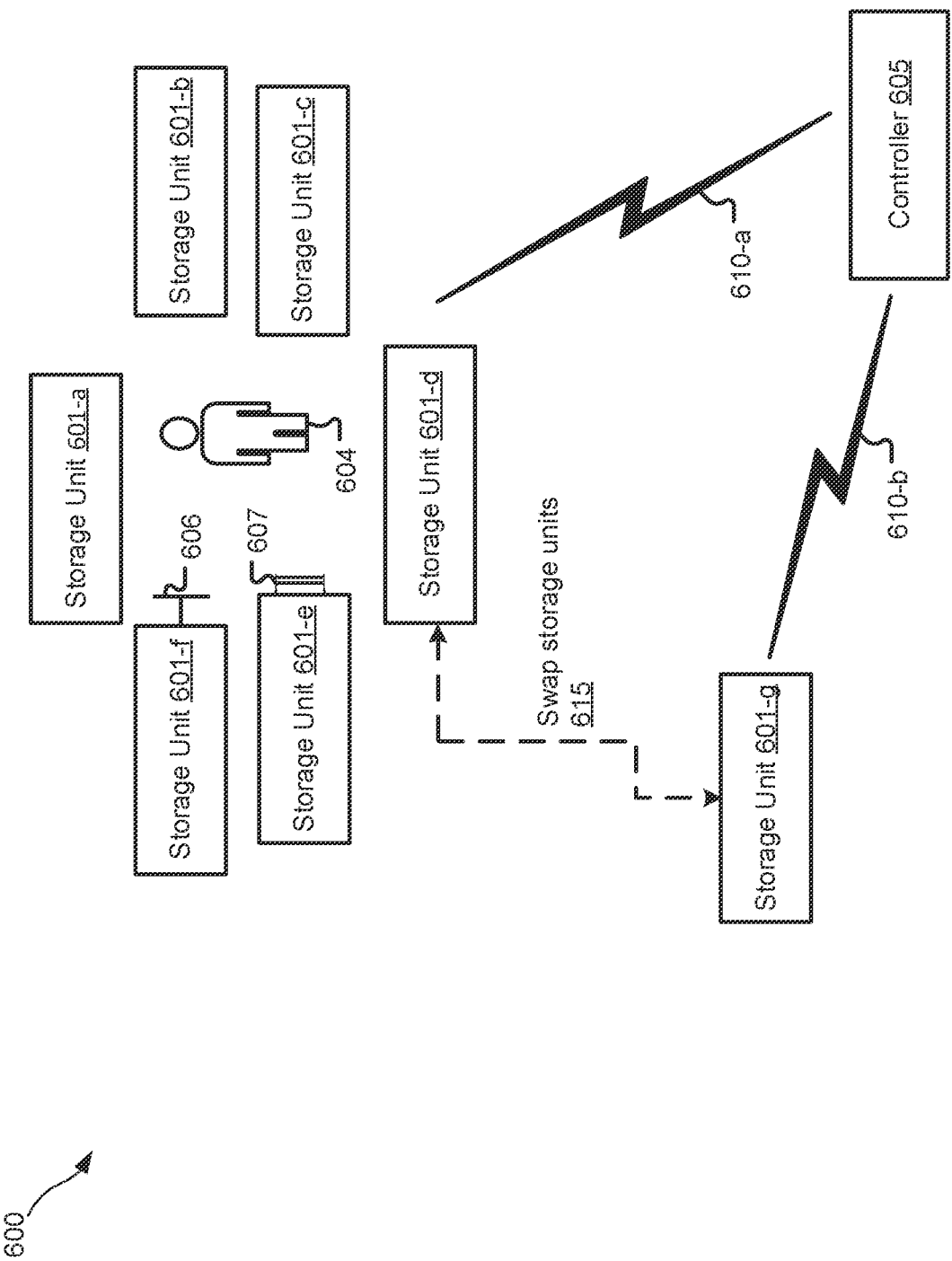
FIG. 6 illustrates an example arrangement of autonomous storage units, in accordance with one or more implementations.

FIG. 6 illustrates an example arrangement of autonomous storage units 601 (or simply, storage units 601) operating in a retail control territory 600 in accordance with an embodiment of the disclosure. In some cases, storage units 601 may be similar or substantially similar to MITUs 400 and/or 500 described above in relation to FIGS. 4 and 5, respectively. In some cases, such as in clothing or department stores, storage units 601 may be employed to provide a private and customized shopping experience to customers. In one example, a retail controller 605 in a clothing store may direct storage units 601-*a* through 601-*f* to arrange in an enclosed area resembling a changing room around customer 604. In some cases, retail controller 605 may communicate with at least one of storage units 601-*a* through 601-*f* using communication link 610-*a*. The communication links 610 (e.g., communication links 610-*a*, 610-*b*) may be examples of wireless communication links, utilizing Wi-Fi, Bluetooth, Long Term Evolution (LTE), such as 3G/4G/5G, or any other applicable technologies. In other cases, the communication links 610 may be examples of wired communication links.

In some cases, storage units 601 may comprise one or more of a mirror (e.g., storage unit 601-*f* comprises mirror 606), shelves and hanging racks (e.g., storage unit 601-*f* comprises hanging rack 607), etc., which may be arranged within the enclosed area. Additionally or alternatively, one or more mirror, shelves, and hanging racks may be arranged outside the enclosed area, making them available for use by other customers or staff at the store. In some embodiments, storage units 601 may be configured to carry clothing items, including shirts, pants, socks, etc., based on the prior shopping history of customer 604, which may take into account one or more of: brands or labels previously bought by the customer 604, sizes, colors and/or patterns (if applicable), price point (e.g., customer 604 usually buys t-shirts under $20, jeans under $100, etc.). In some cases, the storage units 601 may also carry inventory items that the customer 604 is likely to buy, which may be based on comparing an estimated probability to a probability threshold (e.g., 60%) set by the storage units 601, retail controller 605, or another central server or system.

As an example, based on the customer's prior shopping history for t-shirts, one or more of a storage unit 601 and retail controller 605 may estimate the likelihood of customer 604 purchasing a new brand of t-shirt (i.e., brand never purchased by customer 604 before) to be 70%. In such cases, the storage units 601 may be configured to present the brand of t-shirt to the customer based on comparing the estimated probability (i.e., 70%) to the probability threshold (e.g., 60%). In some instances, machine learning techniques may be utilized to identify an appropriate probability threshold to compare to. For instance, a machine learning algorithm may assist in determining a breakeven point (i.e., when the effort expended is at or slightly below the expected reward). Said another way, the machine learning algorithm determines the breakeven point used to set the probability threshold, such that the expected revenue, profits, etc., exceed the effort expended to present said inventory item to the customer (e.g., computing resources, cost associated with a robot presenting an item to the customer, cost associated with another customer having to wait until the robot is done with its task, etc.) when an estimated probability of a customer purchasing an inventory item is at (or above) the breakeven point. Similar machine learning algorithms may also be implemented for determining an appropriate arrangement of storage units in a grocery store and/or determining what inventory items should be presented to a particular customer, to name two non-limiting examples.

In some examples, a storage unit (e.g., storage unit 601-*d*) may comprise a camera configured to interpret visual signals (e.g., hand gestures) from the customer 604. The customer 604 may make a swiping motion in the air (e.g., to the left) indicating that the storage unit 601-*d* should go away. The storage unit 601-*d* or any of the other storage units 601 may also be configured to interpret other types of signals from the user, such as audible signals (e.g., voice recognition) and/or visual signals (e.g., user winks left eye to indicate when a storage unit 601 should leave, user winks right eye to indicate that they are happy with the product and would like to check out; thumbs up or thumbs down, etc.). In this example, the retail controller 605 instructs storage unit 601-*g* to swap out or trade spots with storage unit 601-*d* based on interpreting the user's signals (e.g., shown as swap storage units 615). In some cases, the retail controller may communicate with storage unit 601-*g* over communication link 610-*b*, which may be one of a wired or wireless communication link.

As described above, communication links 610-*a* and/or 610-*b* may be wireless communication links (e.g., cellular, Bluetooth, Wi-Fi, etc.). In other cases, communication links 610-*a* and/or 610-*b* may be wired communication links. In some cases, the inventory items or clothes carried by autonomous storage units 601, including autonomous storage unit 601-*g*, may be based on dynamically modeling the customer's tastes. In other words, the retail controller 605 or another system at the retail store may dynamically experiment with the products or inventory items shown to the customer 604 to build a more refined model of their tastes and preferences over time.

Figure 7:
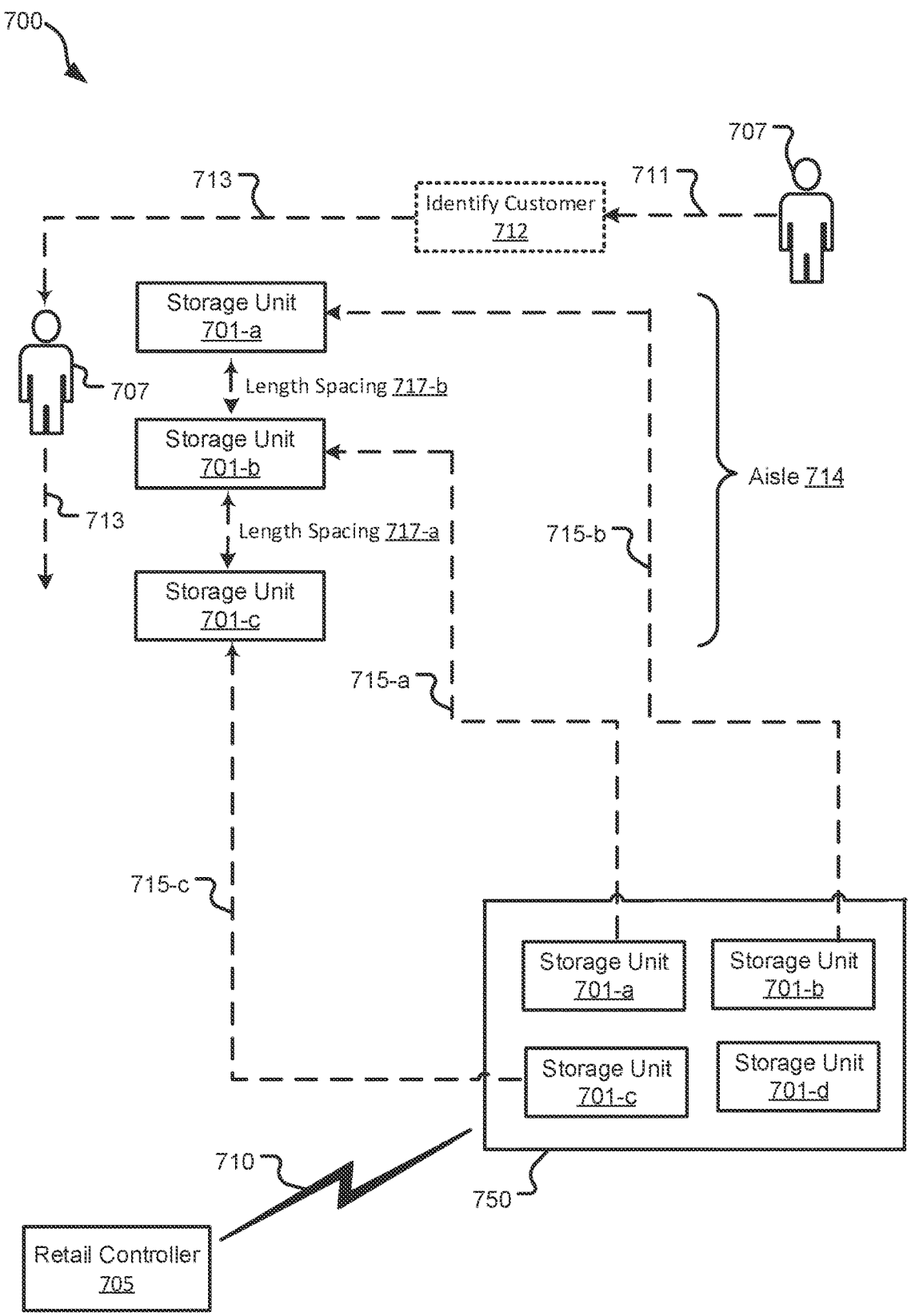
FIG. 7 illustrates a process flow for dynamically organizing autonomous storage units, in accordance with one or more implementations.

FIG. 7 illustrates a process flow 700 for dynamically organizing autonomous storage units 701 (also referred to as autonomous shelves 701) in a retail store, in accordance with an alternate embodiment of the disclosure. In some cases, autonomous shelves 701 may be similar or substantially similar to MITUs 400 and 500 described above in relation to FIGS. 4 and 5, respectively. Furthermore, autonomous shelves 701 may be similar or substantially similar to autonomous shelves 601 described above in relation to FIG. 6. As shown, autonomous shelves 701 may be arranged or organized in a first arrangement 750 (e.g., square arrangement) in an area of the retail store, where the area may be an example of a storage area, fresh produce area, electronics area, pantry stable products area, meat area, etc. In some examples, autonomous storage units 701 may be in communication with a retail controller 705 over communication link 710, which be an example of a wireless communication link.

As described above, in some cases, the resolution of customization in a retail store may be based on an average and self-organizing structure for robot positioning in the store. In other cases, the resolution of customization may be selected from among a plurality of strategies for robot positioning in the store. The resolution of customization may be controlled by the retail controller 705 in the retail control territory, where the retail controller 705 may be similar or substantially similar to the retail controller 605 described in relation to FIG. 6. In some cases, the resolution may be at a customer level, where the arrangement of autonomous shelves 701 and inventory items displayed may vary from customer to customer. In other cases, the resolution may be at a store level. In some circumstances, a retail control territory may comprise a plurality of aisles lined by autonomous shelves, where each aisle is customized for one or more customers. In some embodiments, aisles may vary in length and/or width, based on a number of factors, including the store or retail control territory, identified customer and past buying patterns, inventory items to be displayed, estimated purchase for the customer (e.g., number of items, final bill), etc., to name a few non-limiting examples. For instance, a retail store may be organized based on buying patterns of customers at that store. In such cases, two retail stores operated by the same company in different geographic regions may be organized differently. In another example, a grocery store in a retail control territory may place a high pull item, like milk, towards the end of a customer's aisle, thus compelling the customer to walk to the end of aisle and view additional products or items. Similarly, the spacing between autonomous robots arranged in an aisle formation or another formation (e.g., a square, circle, rectangle, etc.) may be varied based on one or more of the factors described above. In other words, the present disclosure may support a high level of granularity with regards to the different strategies for organizing autonomous robots or shelves in a retail control territory, as further described below.

As illustrated, at step 711, a customer 707 may enter the store. In some embodiments, the store or retail control territory may optionally utilize facial recognition technology to identify customers. For instance, at step 712, the customer 707 may optionally be identified using the facial recognition technology implemented at the store, or through any other means (shown as optional by the dotted lines). After entering the store, the customer 707 may walk along a path 713 in the store. In some cases, the retail controller 705 may direct one or more autonomous storage units 701 (e.g., autonomous storage units 701-a, 701-b, and 701-c) to assemble near the path 713 being walked by the customer 707. In some cases, the retail territory controller may also instruct the one or more storage units 701 to gather inventory items that the identified customer 707 is more likely to buy. In other cases, the retail territory controller may only instruct storage units 701-a-c to assembly near the customer's path 713, based on determining that the customer has a low likelihood of purchasing the inventory items held by storage unit 701-d. As shown in FIG. 7, the autonomous storage units 701-b, 701-a, and 701-c may assemble in their designated spots (e.g., shown by routes 715-a, 715-b, and 715-c) in an aisle 714 (i.e., a second arrangement) along the customer's path 713. It should be noted that other arrangements or formations are contemplated in different embodiments. In some cases, the retail controller 705 may also be configured to control one or more attributes of a storage unit arrangement, such as a length spacing 717-a and/or 717-b between adjacent storage units.

While not shown, the storage units 701 may be configured to arrange in a third arrangement (e.g., two parallel aisles), for instance, when a new customer enters the store, when customer 707 leaves the store, or for any of the other reasons described throughout this disclosure.

Figure 8:
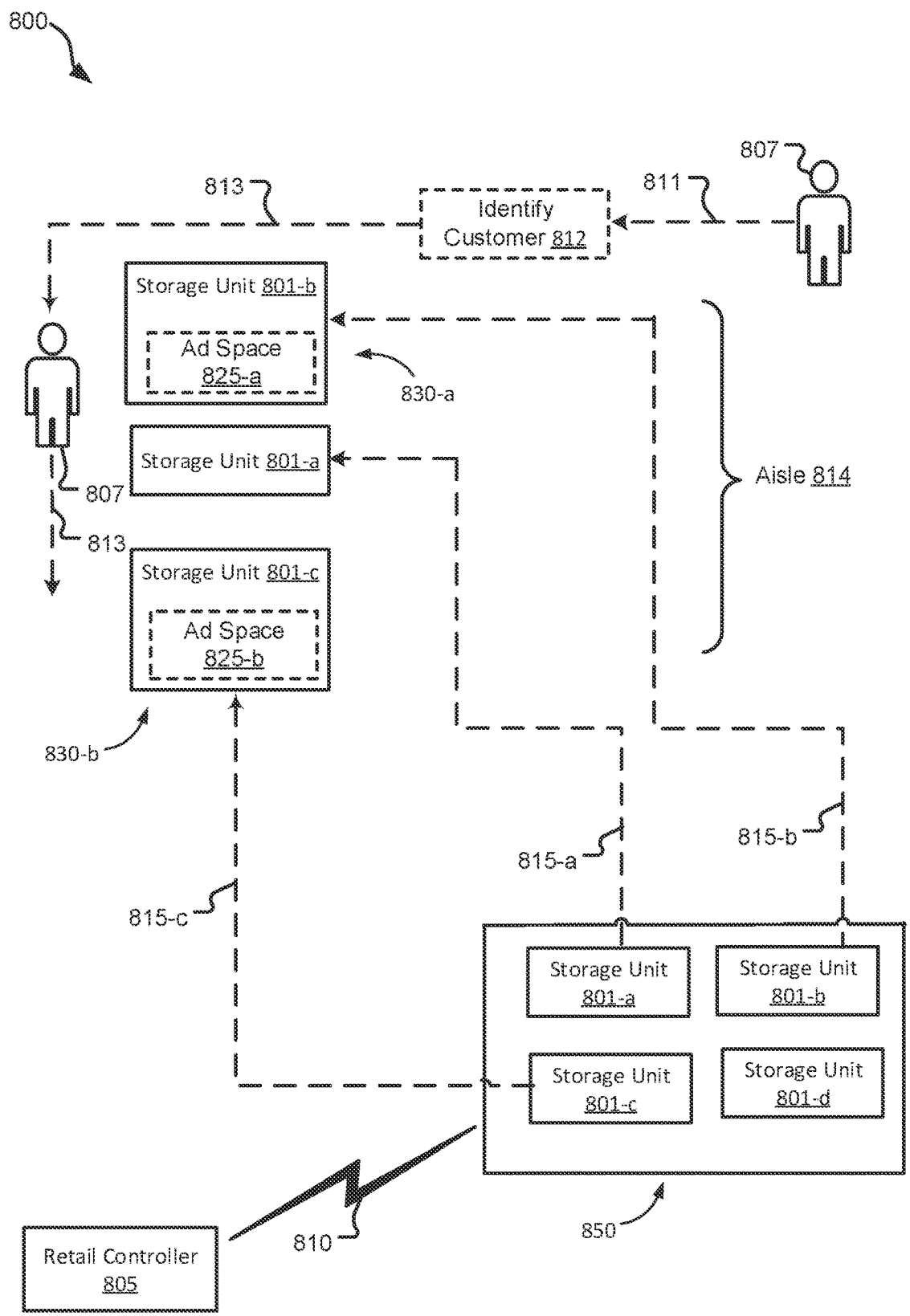
FIG. 8 illustrates another process flow for dynamically organizing autonomous storage units, in accordance with one or more implementations.

FIG. 8 illustrates a process flow 800 for dynamically organizing autonomous storage units 801 in a retail control territory, in accordance with one or more implementations. Process flow 800 implements one or more aspects of the figures described herein, including at least FIGS. 1, 2C, 6, and 7. The autonomous storage units 801 (e.g., autonomous storage units 801-a, 801-b, 801-c, and 801-d) may be similar or substantially similar to the MITUs 400 and/or 500 previously described in relation to FIGS. 4 and 5. In some cases, process flow 800 begins by identifying one or more autonomous storage units 801. Each autonomous storage unit 801 may be configured to hold one or more inventory items.

In some examples, an inventory level for each of the plurality of autonomous storage units 801 may be identified, where the inventory level comprises at least a number and description of one or more inventory items held by each autonomous storage unit. In some cases, process flow 800 comprises determining a first arrangement 850 for the plurality of autonomous storage units based in part on one or more first factors. Some non-limiting examples of the first factors include time of day, ad spaces sold, historical buying patterns for one or more users in the retail control territory, historical selling patterns at the retail control territory, and/or information pertaining to inventory items in stock at the retail control territory. In some cases, the information pertaining to inventory items may include inventory levels, expiration dates (if applicable), and any other relevant information, such as discounts or sales, manager specials, etc. As shown, autonomous storage units 801 may be arranged or organized in the first arrangement 850 in an area of the retail store, where the area may be an example of a storage area, fresh produce area, electronics area, pantry stable products area, meat area, etc.

In some cases, one or more second factors may be identified. The second factors may be similar or substantially similar to the first factors, and may include: time of day, ad spaces sold, historical buying patterns for one or more users in the retail control territory, historical selling patterns at the retail control territory, and/or information pertaining to inventory items in stock at the retail control territory. In some cases, the information pertaining to inventory items may include inventory levels, expiration dates (if applicable), and any other relevant information, such as discounts or sales, manager specials, etc. In some embodiments, the second factors may additionally comprise performance results associated with the first arrangement, where the performance results comprise one or more of a revenue, profits, and/or inventory items sold, to name a few non-limiting examples. Additionally or alternatively, the one or more second factors may be associated with at least one event, where the at least one event comprises: a user entering the retail control territory, an inventory item pick up event, wherein the inventory item pick up event comprises removal of an inventory item from one of the plurality of autonomous storage units, detecting that an inventory level for at least one autonomous storage unit is below a threshold, receiving one or more messages from a central server (e.g., retail controller 805), or a combination thereof.

As illustrated in FIG. 8, a user 807 may enter the retail store at step 811. In some cases, the user 807 may optionally be identified (e.g., using facial recognition technology, or through any other means) at step 812 (e.g., shown as optional by the dotted lines). In some cases, a retail store may sell ad spaces to manufacturers to drive sales, increase revenue and/or profit, promote products, etc. Traditional retail stores arrange products on shelves, where the shelves are organized by category (e.g., condiments in one aisle, cereal in a second aisle, fresh produce in a third aisle, etc.). In some cases, the end cap portions of aisles are considered prime retail space since they are usually associated with higher sales. In some circumstances, end caps in a retail environment may be available for lease to a manufacturer, and they usually command a higher price (e.g., per square foot) than other locations in a retail environment. According to aspects of this disclosure, an ad space may be sold in a retail territory, for instance, on an autonomous storage unit operating in the retail territory. In some cases, the ad spaces may be dynamically configurable and may be sold to the highest bidder. As an example, a first cereal manufacturer may be sold an ad space from 8 am to 10 am, while a second cereal manufacturer may be sold an ad space from 10 am to Noon. In such cases, the autonomous storage units may rearrange themselves such that the inventory items displayed on the endcaps of an aisle correspond to the leased (or sold) ad spaces. In some cases, ad spaces may be sold or leased to the highest bidder in "chunks of time" or time slots. For instance, a snacks or beer manufacturer may be the highest bidder during the days leading up to a big sporting event (e.g., Superbowl), while a candy manufacturer may be the highest bidder during the days leading up to Easter. In another example, a cereal or breakfast bar manufacturer may be the highest bidder on weekday mornings but may be replaced by a manufacturer of quick dinner entrees on weeknights. The dynamic rearrangement of autonomous shelves or robots may not only facilitate in enhancing ad revenue for the retail store, but also sales and/or profits for the manufacturers bidding on the ad spaces.

As shown, after identifying the at least one event (e.g., user 807 entering the retail store), the autonomous storage units may organize into a second arrangement (e.g., shown as aisle 814). In some cases, the retail controller 805 may direct the one or more autonomous storage units 801 (e.g., autonomous storage units 801-*a*, 801-*b*, and 801-*c*) to assemble near the path 813 being walked by the customer 807. In this example, the retail controller 805 instructs the autonomous storage units 801-*b* and 801-*c* that are holding inventory items associated with end cap ad spaces (e.g., ad spaces 825-*a*, 825-*b*) to organize at end caps 830-*a* and 830-*b*, respectively, of aisle 814. In some cases, the retail controller may communicate with the one or more storage units 801 over communication link 810, where the communication link may be a wireless communication link. In this example, autonomous storage units 801-*b*, 801-*a*, and 801-*c* proceed to their designated spots (shown by routes 815-*a*, 815-*b*, and 815-*c*) and arrange in an aisle 814 along the customer's walking path 813.

Figure 9:
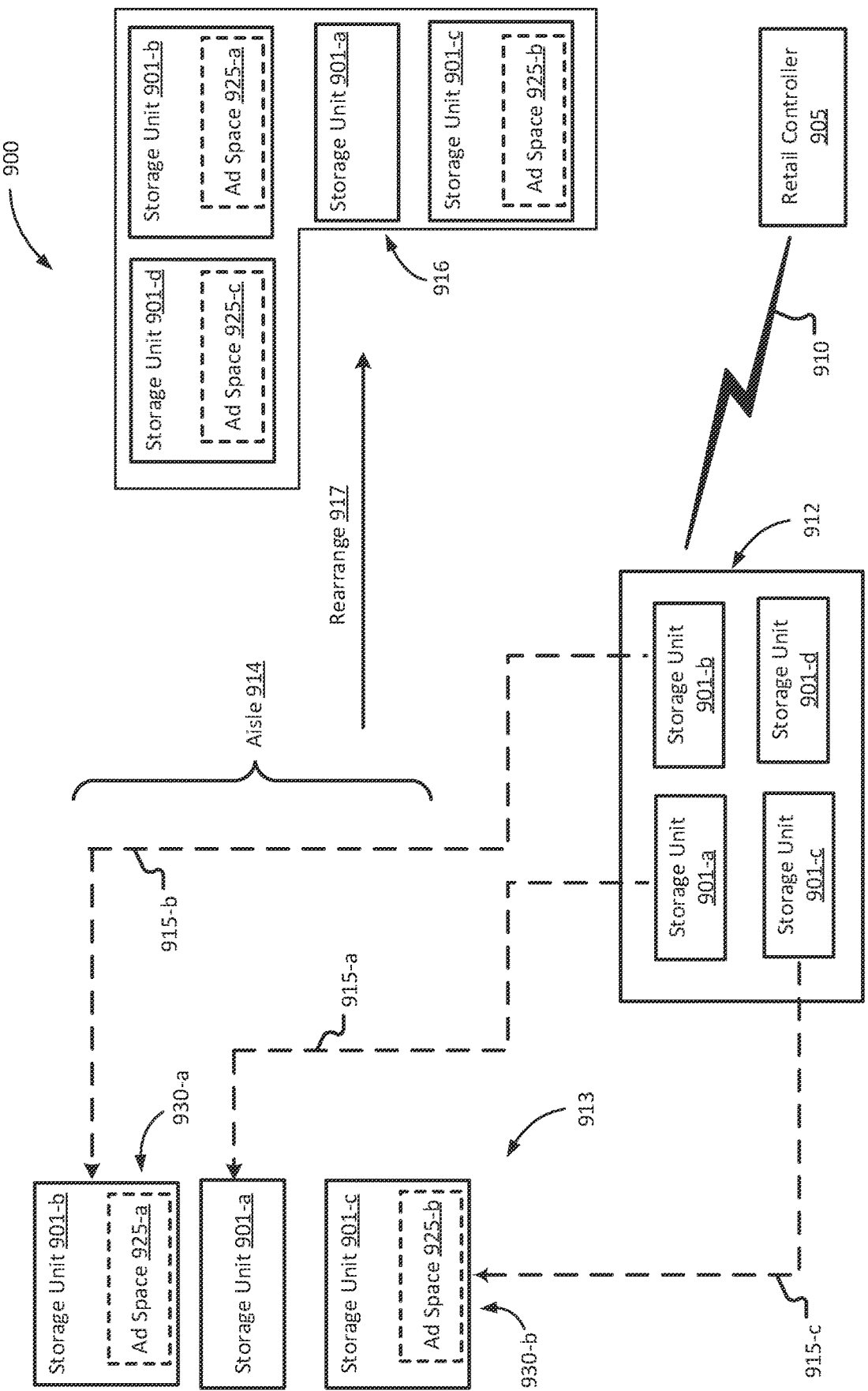
FIG. 9 illustrates yet another process flow for dynamically organizing autonomous storage units, in accordance with one or more implementations.

FIG. 9 illustrates a process flow 900 for dynamically organizing autonomous storage units 901 in a retail control territory, in accordance with one or more implementations. Process flow 900 implements one or more aspects of the figures described herein, including at least FIGS. 1, 2C, and 6-8. The autonomous storage units 901 (e.g., autonomous storage units 901-*a*, 901-*b*, 901-*c*, and 901-*d*) may be similar or substantially similar to the MITUs 400 and/or 500 previously described in relation to FIGS. 4 and 5. In some cases, process flow 900 begins by identifying one or more autonomous storage units 901. Each autonomous storage unit 901 may be configured to hold one or more inventory items.

In this example, the autonomous storage units 901 are initially organized in a first arrangement 912 (e.g., a rectangular arrangement comprising two parallel aisles). In some cases, arrangement or organization of the autonomous storage units in the first arrangement 912 may be based on a variety of factors, including, but not limited to, time of day, ad spaces sold, historical buying patterns for one or more users in the retail control territory, historical selling patterns at the retail control territory, and/or information pertaining to inventory items in stock at the retail control territory. In some cases, the information pertaining to inventory items may include inventory levels, expiration dates (if applicable), and any other relevant information, such as discounts or sales, manager specials, etc.

As shown in process flow 900, the one or more autonomous storage units 901 may be reorganized from the first arrangement 912 to a second, different arrangement 913 based on receiving one or more messages or instructions from a retail controller 905 over communication link 910. Routes 915-*a*, 915-*b*, and 915-*c* depict the paths travelled by autonomous storage units 901-*a*, 901-*b*, and 901-*c*, to reorganize from the first arrangement 912 to the second arrangement 913 (e.g., an aisle 914). Although not necessary, in some cases, one or more second factors may be identified prior to rearrangement. The one or more second factors may be similar or substantially similar to the one or more first factors, and may include: time of day, ad spaces sold, historical buying patterns for one or more users in the retail control territory, historical selling patterns at the retail control territory, and/or information pertaining to inventory items in stock at the retail control territory. In some cases, the information pertaining to inventory items may include inventory levels, expiration dates (if applicable), and any other relevant information, such as discounts or sales, manager specials, etc. In some embodiments, the second factors may additionally comprise performance results associated with the first arrangement 912, where the performance results comprise one or more of a revenue, profits, and/or inventory items sold, to name a few non-limiting examples. Additionally or alternatively, the one or more second factors may be associated with at least one event, where the at least one event comprises: a user entering the retail control territory, an inventory item pick up event, wherein the inventory item pick up event comprises removal of an inventory item from one of the plurality of autonomous storage units, detecting that an inventory level for at least one autonomous storage unit is below a threshold, receiving one or more messages from a central server, or a combination thereof. In some cases, the one or more messages may be received from retail controller 905 over communication link 910. For example, the retail controller 905 may direct the autonomous storage units 901 to reorganize from the first arrangement 912 to the second arrangement 913 in response to detecting the at least one event. Alternatively, the autonomous storage units 901 may be configured to dynamically test different arrangements to determine an optimal arrangement for the retail store. In yet other cases, retail control territories may share performance results for different autonomous shelf arrangements with each other. For instance, retail controller 905 may have received an indication of the second arrangement 913 from a retail controller in a different retail store. Further, the retail controller in the different retail store may have included performance results for the second arrangement 913, where the performance results show enhanced performance (e.g., higher sales, higher profits, etc.) for the second arrangement 913 as compared to the first arrangement 912. In some cases, the one or more autonomous storage units 901 may further rearrange 917 from the second arrangement 913 to a third arrangement 916 (e.g., an L shape). Reorganization from the second arrangement 912 to the third arrangement may be based on one or more third factors, which may be similar or substantially to one or more of the first and the second factors.

As described above, in some cases, the retail store may sell or lease ad spaces (e.g., ad space 925-*a*, 925-*b*) to one or more manufacturers. In some cases, the ad spaces 925 may be located on end caps of aisles (e.g., shown as end caps 930-*a* and 930-*b* of aisle 914), although other types of ad spaces (e.g., eye level shelf, top shelf, etc.) are contemplated in different embodiments. In this example, three of the four autonomous storage units 901 (e.g., storage units 901-*b*, 901-*c*, and 901-*d*) comprise ad spaces 925. For instance, autonomous storage units 901-*b* and 901-*c* comprise end cap ad spaces (e.g., shown as ad spaces 925-*a* and 925-*b*), while autonomous storage unit 901-*d* comprises an eye level shelf ad space (e.g., shown as ad space 925-*c*). In other words, the autonomous storage units 901-*b* and 901-*c* hold inventory items for one or more manufacturers that have leased or bought an end cap ad space, while the autonomous storage unit 901-*d* holds inventory items for one or more manufacturers that have leased or bought an eye level shelf ad space. Although not necessary, in some cases, the end cap ad spaces may occupy the entirety of the autonomous storage unit. Alternatively, the end cap ad spaces may occupy only a portion of the autonomous storage unit. In some cases, the autonomous storage units 901-*a*-*d* may reorganize into the third arrangement 916 based on receiving one or more messages from the retail controller over communication link 910. As an example, a manufacturer may have leased an ad space for one or more inventory items held by the autonomous storage unit 901-*d* between 8 am to Noon. In this example, the retail controller may direct the autonomous storage units 901 to organize into the third arrangement at or near 8 am, such that autonomous storage unit 901-*d* occupies a prime retail space in the store. In another example, the retail controller 905 may identify that a user who has a higher likelihood of purchasing items held by autonomous storage unit 901-*d* just walked into the retail store. In this example, the retail controller may instruct the autonomous storage unit 901-*d* to position near the other autonomous storage units (e.g., upon determining its absence in the second arrangement 913). In another example, the autonomous storage unit 901-*d* may be absent from the second arrangement 913, for instance, due to its inventory level being below a threshold. In such cases, the retail controller 905 may instruct the autonomous storage unit 901-*d* to replenish its inventory items, for instance, from a storage area at the back of the store. In some cases, the depleted autonomous storage unit 901-*d* may be reloaded with one or more inventory items in stock at the retail store by one or more of a human operator and a robot. The robot may be another autonomous storage unit. Alternatively, the robot may be specially configured to load autonomous storage units with inventory items held in the storage area. After being replenished, the autonomous storage unit 901-*d* may return to the retail space and may be instructed by the retail controller 905 to position itself adjacent the one or more other autonomous storage units, for instance.

It should be noted that the arrangements 912, 913, 916 and example scenarios that trigger a rearrangement of autonomous storage units described above are not intended to be limiting. For instance, autonomous storage units may be rearranged for other reasons not explicitly described herein, and may be rearranged into other shapes (e.g., circle, elliptical, etc.) in different embodiments. In some cases, the shuffle from the first arrangement 912 to the second arrangement 913 may be triggered based on identifying that a first user has left the retail store and a second, different user has entered the retail store. The second arrangement 913 may serve to provide an optimal shopping experience for the second user (e.g., based on analyzing previous buying history for the second user). Additionally or alternatively, the second arrangement 913 may serve to maximize the revenue or profits generated from the second user. Alternatively, the second arrangement 913 may be triggered based on a time of day and ad space leasing arrangement between the retail store and one or more manufacturers. Similarly, the shuffle (shown as rearrange 917) from the second arrangement 913 to the third arrangement 916 may be triggered based on detecting that a third user has entered the retail store. Alternatively, the third arrangement 916 may be triggered based on the second user requesting an inventory item held by the autonomous storage unit 901-*d*. In such cases, the autonomous storage unit 901-*d* holding the inventory item may be directed to the second user's location in the retail store. In some cases, autonomous storage units may be assigned a score, for instance, for each user. The assigned score may be based on numerous factors, including at least the previous buying history of the user, as well as the inventory item(s) held by the autonomous storage unit. In this way, when a particular user walks into the retail store, only a portion of the autonomous storage units operating in the store may be presented to the user. For instance, the autonomous storage units having the three highest scores for that particular user may be presented to the user. It should be noted that an autonomous storage unit having a high score for one user may have a low score for a second, different user.

In some aspects, the dynamic organization of autonomous shelves may serve to amplify revenues and profits at retail stores. Further, by considering shopping histories of individual customers, transaction history of a store, current inventory level at the store, expiration dates of inventory items in the store, etc., in conjunction with various strategies for rearranging the floor plan, stores may not only enhance their bottom line (i.e., profits), but also customer experience.

Additional Embodiments

One aspect of the present disclosure relates to a system configured for directing and controlling an autonomous inventory management system in a retail control territory. The system may include one or more hardware processors configured by machine-readable instructions. The processor(s) may be configured to identify a user identity for a user. The processor(s) may be configured to estimate, for the user, a likelihood of purchasing one or more inventory items in stock at the retail control territory. The processor(s) may be configured to place at least a portion of the one or more inventory items in one or more autonomous storage units based at least in part on the identifying and the estimating. The processor(s) may be configured to arrange or organize the one or more autonomous storage units based in part on the identifying and the estimating. The processor(s) may be configured to determine one or more inventory item pick up events for at least one autonomous storage unit of the one or more autonomous storage units. Each inventory item pick up event is linked to a respective inventory item.

The processor(s) may be configured to bill the user based at least in part on the determining. The processor(s) may be configured to update an inventory level for the at least one autonomous storage unit. The updating may be based in part on one or more of the determining and the billing.

Another aspect of the present disclosure relates to a method for directing and controlling an autonomous inventory management system in a retail control territory. The method may include identifying a user identity for a user. The method may include estimating, for the user, a likelihood of purchasing one or more inventory items in stock at the retail control territory. The method may include placing at least a portion of the one or more inventory items in one or more autonomous storage units based at least in part on the identifying and the estimating.

The method may include arranging or organizing the one or more autonomous storage units based in part on the identifying and the estimating. The method may include determining one or more inventory item pick up events for at least one autonomous storage unit of the one or more autonomous storage units. Each inventory item pick up event may be linked to a respective inventory item. The method may include billing the user based at least in part on the determining. The method may include updating an inventory level for the at least one autonomous storage unit. The updating may be based in part on one or more of the determining and the billing.

Yet another aspect of the present disclosure relates to a computing platform configured for directing and controlling an autonomous inventory management system in a retail control territory. The computing platform may include a non-transient computer-readable storage medium having executable instructions embodied thereon. The computing platform may include one or more hardware processors configured to execute the instructions. The processor(s) may execute the instructions to identify a user identity for a user. The processor(s) may execute the instructions to estimate, for the user, a likelihood of purchasing one or more inventory items in stock at the retail control territory. The processor(s) may execute the instructions to place at least a portion of the one or more inventory items in one or more autonomous storage units based at least in part on the identifying and the estimating. The processor(s) may execute the instructions to arrange or organize the one or more autonomous storage units based in part on the identifying and the estimating. The processor(s) may execute the instructions to determine one or more inventory item pick up events for at least one autonomous storage unit of the one or more autonomous storage units. Each inventory item pick up event may be linked to a respective inventory item. The processor(s) may execute the instructions to bill the user based at least in part on the determining. The processor(s) may execute the instructions to update an inventory level for the at least one autonomous storage unit. The updating may be based in part on one or more of the determining and the billing.

Still another aspect of the present disclosure relates to a system configured for directing and controlling an autonomous inventory management system in a retail control territory. The system may include means for identifying a user identity for a user. The system may include means for estimating, for the user, a likelihood of purchasing one or more inventory items in stock at the retail control territory. The system may include means for placing at least a portion of the one or more inventory items in one or more autonomous storage units based at least in part on the identifying and the estimating. The system may include means for arranging or organizing the one or more autonomous storage units based in part on the identifying and the estimating. The system may include means for determining one or more inventory item pick up events for at least one autonomous storage unit of the one or more autonomous storage units. Each inventory item pick up event is linked to a respective inventory item. The system may include means for billing the user based at least in part on the determining. The system may include means for updating an inventory level for the at least one autonomous storage unit. The updating may be based in part on one or more of the determining and the billing.

Even another aspect of the present disclosure relates to a non-transient computer-readable storage medium having instructions embodied thereon, the instructions being executable by one or more processors to perform a method for directing and controlling an autonomous inventory management system in a retail control territory. The method may include identifying a user identity for a user. The method may include estimating, for the user, a likelihood of purchasing one or more inventory items in stock at the retail control territory. The method may include placing at least a portion of the one or more inventory items in one or more autonomous storage units based at least in part on the identifying and the estimating. The method may include arranging or organizing the one or more autonomous storage units based in part on the identifying and the estimating. The method may include determining one or more inventory item pick up events for at least one autonomous storage unit of the one or more autonomous storage units. Each inventory item pick up event may be linked to a respective inventory item. The method may include billing the user based at least in part on the determining. The method may include updating an inventory level for the at least one autonomous storage unit. The updating may be based in part on one or more of the determining and the billing.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for dynamically organizing autonomous storage units in a retail control territory, the system comprising:
   one or more hardware processors configured by machine-readable instructions to:
   identify a plurality of autonomous storage units, wherein each autonomous storage unit comprises:
   a housing,
   an inventory storage device physically coupled to the housing, and configured to transport at least one inventory item,
   a power device, wherein the power device is operationally configured to supply power to electrical components of the autonomous storage unit,
   a drive device in electrical communication with the power device, the drive device operationally configured to physically move the autonomous storage unit in one or more control territories, including at least the retail control territory, and one or more of:
- a navigation device operationally configured to transmit and receive geographic data and determine a physical location of the autonomous storage unit,
- a sensing device operationally configured to detect physical objects and transmit and receive physical object data, and
- a control device, wherein the control device is in electronic communication with the power device, the drive device, and one or more of the navigation device and the sensing device, and is operationally configured to control the autonomous storage unit;

and wherein the one or more hardware processors are further configured by machine readable instructions to:
designate one or more floor areas of the retail control territory as available for lease to product manufacturers, wherein at least a portion of the designated one or more floor spaces are end-cap aisle spaces;
receive bids from the product manufacturers to lease the end-cap aisle spaces for a specified period of time;
assign an end-cap aisle space to a product manufacturer having a highest bid for the specified period of time;
determine an autonomous storage unit is associated with the product manufacturer having the highest bid, wherein determining the association between the autonomous storage unit and the product manufacturer having the highest bid is based on inventory items held by the autonomous storage unit;
direct the determined autonomous storage unit to travel to the assigned end-cap aisle space and occupy the assigned end-cap aisle space for the specified period of time; and
direct the determined autonomous storage unit to travel away from the assigned end-cap aisle space after expiration of the specified period of time.

2. The system of claim 1, wherein the one or more hardware processors are further configured by machine-readable instructions to:
determine a user identity of a user entering the retail control territory; and
direct at least a portion of the plurality of autonomous storage units to arrange in the retail control territory based on the user identity.

3. The system of claim 2, wherein the one or more hardware processors are further configured by machine-readable instructions to:
retrieve, based on the user identity, a user profile stored in a user profile database;
determine a buying history pattern of the user from the user profile;
assign a user score to each autonomous storage unit in the retail control territory, each user score computed based on a comparison of the buying history pattern to inventory items carried by a given autonomous storage unit; and
direct the at least portion of the plurality of autonomous storage units to arrange in the retail control territory based on the user score.

4. The system of claim 2, wherein the one or more hardware processors are further configured by machine-readable instructions to:
determine, for each of the plurality of autonomous storage units, a calculated probability of purchase by the user with respect to inventory items carried by a given autonomous storage unit;
assign each of the plurality of autonomous storage units a probability threshold; and
direct the at least portion of the plurality of autonomous storage units to arrange in the retail control territory based on a comparison of calculated probability and the probability threshold for each of the plurality of autonomous storage units.

5. The system of claim 4, wherein the one or more hardware processors are further configured by machine-readable instructions to:
determine a first portion of the plurality of autonomous storage units having a calculated probability exceeding a probability threshold;
determine a second portion of the plurality of autonomous storage units having a calculated probability not exceeding a probability threshold;
direct the first portion of the plurality of autonomous storage units to assemble to floor areas of the retail control territory adjacent to a walking path of the user; and
direct the second portion of the plurality of autonomous storage units to assemble at a storage area of the retail control territory.

6. The system of claim 4, wherein the one or more hardware processors are further configured by machine-readable instructions to:
determine the probability threshold for each of the plurality of autonomous storage units with a machine learning function using expected cost and revenue variables as input.

7. The system of claim 2, wherein the one or more hardware processors are further configured by machine-readable instructions to:
determine a price of inventory items for each of the at least portion of the plurality of autonomous storage units based on the user identity;
direct each of the at least portion of the plurality of autonomous storage units to display the determined price of inventory items;
direct the at least portion of the plurality of autonomous storage units to arrange around the user;
determine one autonomous storage unit which has received a request from the user to purchase an inventory item; and
direct the one autonomous storage unit to conduct a transaction with the user to complete the purchase of the inventory item.

8. The system of claim 1, wherein the one or more hardware processors are further configured by machine-readable instructions to:
assign first rules to a first portion of the plurality of autonomous storage units restricting automatic arrangement of the first portion of the plurality of autonomous storage units to one or more designated aisles of the retail control territory; and
assign second rules to a second portion of the plurality of autonomous storage units allowing automatic arrangement of the second portion of the plurality of autonomous storage units to designated areas near an entrance of the retail control territory.

9. The system of claim 1, wherein the one or more hardware processors are further configured by machine-readable instructions to:
 determine a user behavior of a user in the retail control territory; and
 direct at least a portion of the plurality of autonomous storage units to arrange in an aisle formation customized to the user based on the user behavior.

10. The system of claim 1, wherein the one or more hardware processors are further configured by machine-readable instructions to:
 identify an inventory level for the plurality of autonomous storage units, the inventory level comprising at least a number and description of one or more inventory items held by the plurality of autonomous storage units.

11. The system of claim 1, wherein the one or more hardware processors are further configured by machine-readable instructions to:
 direct a portion placing module to stock inventory items of the product manufacturer on the determined autonomous storage unit prior to the specified period of time.

12. A method for dynamically organizing autonomous storage units in a retail control territory, the method comprising:
 identifying a plurality of autonomous storage units, wherein each autonomous storage unit is configured to hold one or more inventory items;
 storing, in memory, a floor configuration of a retail control territory;
 designating one or more floor areas of the floor configuration as available for lease to product manufacturers, wherein at least a portion of the designated one or more floor areas are end-cap aisle spaces;
 receiving bids from the product manufacturers to lease the end-cap aisle spaces for a specified period of time;
 assigning an end-cap aisle space to a product manufacturer having a highest bid for the specified period of time;
 determining an autonomous storage unit is associated with the product manufacturer having the highest bid, wherein determining the association between the autonomous storage unit and the product manufacturer having the highest bid is based on inventory items held by the autonomous storage unit;
 directing, with a processor in communication with the memory, the determined autonomous storage unit to travel to the assigned end-cap aisle space and occupy the assigned end-cap aisle space for the -specified period of time; and
 directing the determined autonomous storage unit to travel away from the assigned end-cap aisle space after expiration of the specified period of time.

13. The method of claim 12, further comprising:
 determining a user identity of a user entering the retail control territory; and
 directing the at least the portion of the plurality of autonomous storage units to arrange in the retail control territory based on the user identity.

14. The method of claim 13, further comprising:
 retrieving, based on the user identity, a user profile stored in a user profile database;
 determining a buying history pattern of the user from the user profile;
 assigning a user score to each autonomous storage unit in the retail control territory, each user score computed based on a comparison of the buying history pattern to inventory items carried by a given autonomous storage unit; and
 directing the at least the portion of the plurality of autonomous storage units to arrange in the retail control territory based on the user score.

15. The method of claim 12, further comprising:
 assigning first rules to a first portion of the plurality of autonomous storage units restricting automatic arrangement of the first portion of the plurality of autonomous storage units to one or more designated aisles of the retail control territory; and
 assigning second rules to a second portion of the plurality of autonomous storage units allowing automatic arrangement of the second portion of the plurality of autonomous storage units to designated areas near an entrance of the retail control territory.

16. The method of claim 12, further comprising:
 determining a user behavior of a user in the retail control territory; and
 directing at least a portion of the plurality of autonomous storage units to arrange in an aisle formation customized to the user based on the user behavior.

17. A non-transitory computer-readable storage medium having instructions embodied thereon, the instructions being executable by one or more processors to perform a method for dynamically organizing autonomous storage units in a retail control territory, the method comprising:
 identifying a plurality of autonomous storage units, wherein each autonomous storage unit is configured to hold one or more inventory items;
 designating one or more floor areas of the retail control territory as available for lease to product manufacturers, wherein at least a portion of the designated one or more floor areas are end-cap aisle spaces;
 receiving bids from the product manufacturers to lease the end-cap aisle spaces for a specified period of time;
 assigning an end-cap aisle space to a product manufacturer having a highest bid for the specified period of time;
 determining an autonomous storage unit is associated with the product manufacturer having the highest bid, wherein determining the association between the autonomous storage unit and the product manufacturer having the highest bid is based on inventory items held by the autonomous storage unit; and
 directing the determined autonomous storage unit to travel to the assigned end-cap aisle space and occupy the assigned end-cap aisle space for the specified period of time; and
 directing the determined autonomous storage unit to travel away from the assigned end-cap aisle space after expiration of the specified period of time.

18. The non-transitory computer-readable storage medium of claim 17, the method further comprising:
 determining a user identity of a user entering the retail control territory; and
 directing the at least the portion of the plurality of autonomous storage units to arrange in the retail control territory based on the user identity.

19. The non-transitory computer-readable storage medium of claim 18, the method further comprising:
 retrieving, based on the user identity, a user profile stored in a user profile database;
 determining a buying history pattern of the user from the user profile;

assigning a user score to each autonomous storage unit in the retail control territory, each user score computed based on a comparison of the buying history pattern to inventory items carried by a given autonomous storage unit; and directing the at least the portion of the plurality of autonomous storage units to arrange in the retail control territory based on the user score.

20. The non-transitory computer-readable storage medium of claim 17, the method further comprising:

determining a user behavior of a user in the retail control territory; and directing at least a portion of the plurality of autonomous storage units to arrange in an aisle formation customized to the user based on the user behavior.

* * * * *